(12) United States Patent
Furukawa

(10) Patent No.: US 8,597,847 B2
(45) Date of Patent: Dec. 3, 2013

(54) FUEL CELL SYSTEM AND TRANSPORTATION EQUIPMENT INCLUDING THE SAME

(75) Inventor: Kazuyoshi Furukawa, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 397 days.

(21) Appl. No.: 12/709,576

(22) Filed: Feb. 22, 2010

(65) Prior Publication Data

US 2010/0221631 A1 Sep. 2, 2010

(30) Foreign Application Priority Data

Feb. 27, 2009 (JP) ................... 2009-045589

(51) Int. Cl.
*H01M 8/04* (2006.01)

(52) U.S. Cl.
USPC ........... 429/442; 429/429; 429/430; 429/443; 429/449

(58) Field of Classification Search
USPC .......... 429/428, 429, 430, 433, 442, 443, 449
See application file for complete search history.

(56) References Cited

U.S. PATENT DOCUMENTS

| | | | | |
|---|---|---|---|---|
| 5,677,073 | A * | 10/1997 | Kawatsu | 429/442 |
| 6,555,928 | B1 * | 4/2003 | Mizuno et al. | 290/40 C |
| 2002/0148284 | A1 | 10/2002 | Baldauf et al. | |
| 2006/0141307 | A1 | 6/2006 | Ryoichi et al. | |
| 2006/0228599 | A1 | 10/2006 | Takaiwa | |
| 2007/0054159 | A1 | 3/2007 | Ryoichi et al. | |
| 2008/0160368 | A1 | 7/2008 | Muramatsu | |

FOREIGN PATENT DOCUMENTS

| | | | |
|---|---|---|---|
| JP | 59-207565 A | 11/1984 | |
| JP | 7-249423 A | 9/1995 | |
| JP | 09-306520 A | 11/1997 | |
| JP | 2002-184435 A | 6/2002 | |
| JP | 2003-511833 A | 3/2003 | |
| JP | 2004-192889 A | 7/2004 | |
| JP | 2004-319437 A | 11/2004 | |
| JP | 2005-100886 A | 4/2005 | |
| JP | 2005-149897 A | 6/2005 | |
| JP | 2005-150019 A | 6/2005 | |
| JP | 2006-253046 A | 9/2006 | |
| JP | 2006-253096 A | 9/2006 | |
| JP | 2006-294470 A | 10/2006 | |
| JP | 2006-302515 A | 11/2006 | |
| JP | 2008-34380 A | 2/2008 | |
| JP | 2008-181871 A | 8/2008 | |
| WO | 2004/030134 A1 | 4/2004 | |
| WO | WO2005099015 | * | 10/2005 |

* cited by examiner

*Primary Examiner* — Ula C. Ruddock
*Assistant Examiner* — Thomas H. Parsons
(74) *Attorney, Agent, or Firm* — Keating & Bennett, LLP

(57) ABSTRACT

A fuel cell system for use in transportation equipment, for example, can determine an abnormality in its fuel supply device without additional detectors being provided for abnormality detection. The fuel cell system is mounted on a motorbike, and includes a cell stack which includes a plurality of fuel cells, an aqueous solution pump arranged to supply aqueous methanol solution to the cell stack, a controller which includes a CPU, an inflow temperature sensor arranged to detect a temperature of aqueous methanol solution which is introduced to the cell stack, and an outflow temperature sensor arranged to detect a temperature of aqueous methanol solution discharged from the cell stack. The CPU obtains an inflow outflow temperature difference by calculating a difference between a detection result from the inflow temperature sensor and a detection result from the outflow temperature sensor. Then, the CPU compares the inflow outflow temperature difference to a predetermined value, and thereby determines whether or not there is any abnormality in the aqueous solution pump.

15 Claims, 14 Drawing Sheets

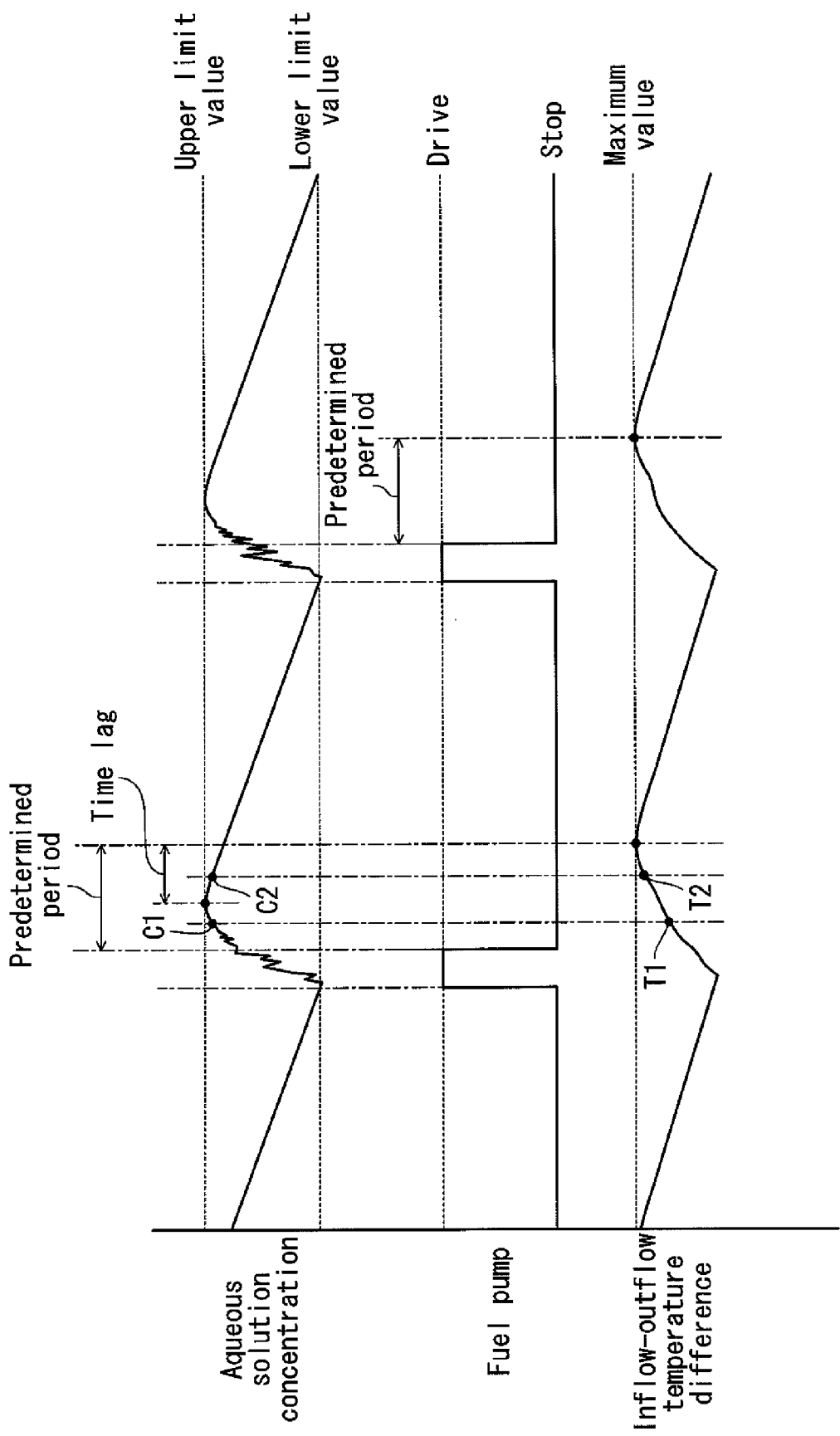

F I G. 1 1
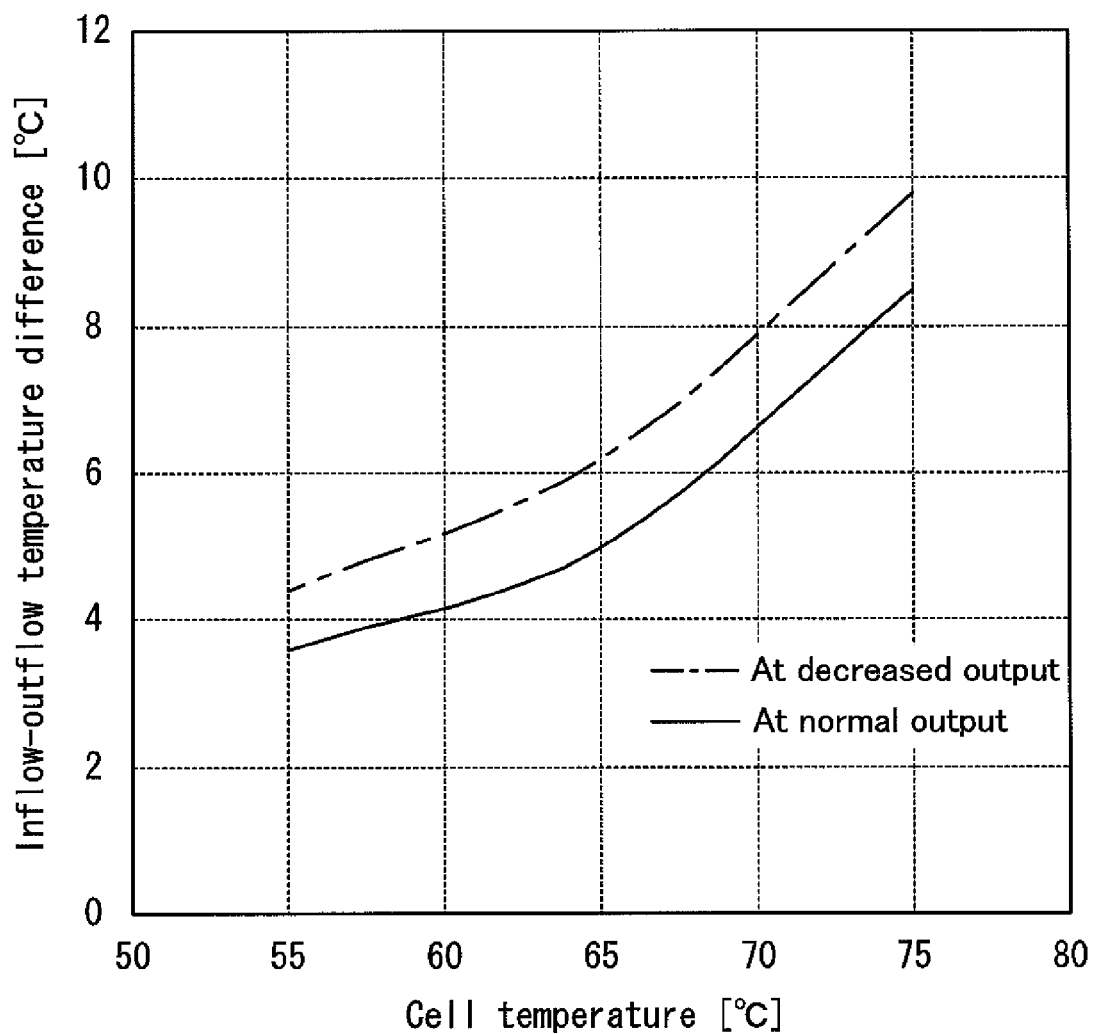

FUEL CELL SYSTEM AND TRANSPORTATION EQUIPMENT INCLUDING THE SAME

BACKGROUND OF THE INVENTION

1. Field of the Invention

The present invention relates to a fuel cell system and transportation equipment including such a fuel cell system. More specifically, the present invention relates to a fuel cell system featuring a protective function, and transportation equipment including such a fuel system.

2. Description of the Related Art

In fuel cell systems, fuel is supplied to an anode of the fuel cell by a fuel supply device whereas air, which contains oxygen, is supplied to a cathode of the fuel cell by an air supply device. The amount of fuel supply and the amount of air supply are balanced with respect to each other so that power generation takes place uniformly in the entire fuel cell. Deterioration of the fuel supply device can reduce the amount of fuel supply to the anode, which will destroy the balance between the amount of air supply and the amount of fuel supply. As a result, there can be cases where there is enough supply of fuel near an anode inlet of the fuel cell but there is a shortage of fuel near an anode outlet of the fuel cell. Non-uniform distribution of fuel in the anode as described can deteriorate the fuel cell performance. Also, a decrease in the amount of fuel supply will cause other problems such as a decrease in the output from the fuel cell.

JP-A 2002-184435 discloses a fuel cell system which detects abnormalities in a coolant pump based on an amount of coolant flow, etc.

However, the application of the technique disclosed in JP-A 2002-184435 for abnormality determination in a fuel supply device requires detectors such as a flow sensor to be provided additionally.

SUMMARY OF THE INVENTION

Therefore, preferred embodiments of the present invention provide a fuel cell system capable of determining abnormalities in the fuel supply device without additional detectors provided for the abnormality determination, and also provide transportation equipment including such a fuel cell system.

According to a preferred embodiment of the present invention, a fuel cell system includes a fuel cell, a fuel supply device arranged to supply the fuel cell with a fuel, a first temperature detector arranged to detect first temperature information regarding a temperature of the fuel supplied to the fuel cell, a second temperature detector arranged to detect second temperature information regarding a temperature of the fuel discharged from the fuel cell, and an abnormality determination section arranged to determine an abnormality in the fuel supply device based on a result of comparison between a predetermined value and difference information regarding a difference between the first temperature information and the second temperature information.

Normally, for the purpose of system temperature control, fuel cell systems are provided with a temperature detector arranged to detect temperatures of the fuel supplied to the fuel cell and a temperature detector arranged to detect temperatures of the fuel discharged from the fuel cell. In a preferred embodiment of the present invention, difference information between the first temperature information detected by the first temperature detector and the second temperature information detected by the second temperature detector is obtained. Thereafter, the difference information is compared to a predetermined value. If there is an abnormality such as stoppage of the fuel supply device, decrease in the output thereof, or the like, the fuel stays in the fuel cell for an extended period of time, causing an increase in the difference information. The predetermined value represents difference information which is likely to be obtained when the fuel supply device is normal. Therefore, if the comparison between the difference information and the predetermined value shows that the difference information is not smaller than the predetermined value, it is possible to determine that the fuel supply device is in an abnormal state. As described, by using detection results from the first temperature detector and the second temperature detector, the fuel cell system can determine an abnormality in the fuel supply device without the need to use additional detectors for the abnormality detection purpose.

Preferably, the fuel cell system further includes a setting section arranged to set the predetermined value based on power generation information regarding a state of power generation in the fuel cell. In this case, the fuel cell system sets the predetermined value based on the state of power generation in the fuel cell. Even when the fuel supply device is normal, the difference information varies with the state of power generation in the fuel cell. Therefore, by setting an appropriate value as the predetermined value based on the state of power generation in the fuel cell, the fuel cell system can determine an abnormality in the fuel supply device appropriately.

Further preferably, the fuel is provided by aqueous fuel solution. With this, the fuel cell system further includes a concentration detector arranged to detect concentration information regarding a concentration of the aqueous fuel solution, and the power generation information is provided by the concentration information. In this case, the fuel cell system sets the predetermined value based on the concentration information. The fuel cell temperature, and hence the temperature of aqueous fuel solution discharged from the fuel cell increases with the concentration of aqueous fuel solution, and the difference information also increases with the concentration of aqueous fuel solution. Therefore, the fuel cell system can set an appropriate value as the predetermined value based on the concentration information, and can determine appropriately an abnormality in the fuel supply device.

Further, preferably, the fuel cell system further includes a concentration adjuster arranged to adjust the concentration of the aqueous fuel solution. With this arrangement, the concentration detector performs detection while the concentration adjuster is not in operation. While the adjuster is making concentration adjustment to aqueous fuel solution, the aqueous solution concentration change is unstable and it can be impossible to set an appropriate value as the predetermined value based on the detected concentration. Therefore, the detection of aqueous fuel solution concentration is performed when the concentration adjuster is not in operation. Thus, the fuel cell system avoids concentration detection when the aqueous solution concentration change is unstable, and can set an appropriate value as the predetermined value reliably.

Preferably, the concentration detector performs the detection after a lapse of a predetermined period from a stoppage of the concentration adjuster. By waiting for a predetermined period of time from a stoppage of the concentration adjuster, the aqueous solution concentration change becomes more stable, and the system can set an appropriate value as the predetermined value more reliably.

Further preferably, the predetermined period is provided by a period necessary at least for the difference information to attain its maximum value after the stoppage of the concentration adjuster. The aqueous solution concentration attains its maximum value after a while following the stoppage of the concentration adjuster, and then decreases thereafter. Also, the difference information attains its maximum value after a while following the peak of the aqueous fuel solution concentration, and then decreases thereafter. The system sets a period of time which is necessary at least for the difference information to attain the maximum value from the stoppage of the concentration adjuster, as the predetermined period, and detects the concentration of aqueous fuel solution after a lapse of the predetermined period. This ensures that the fuel cell system can obtain a concentration which has a one-to-one relationship with the difference information, and set an appropriate value as the predetermined value more reliably.

Further, preferably, the fuel cell system further includes at least one of a third temperature detector arranged to detect third temperature information regarding a temperature of the fuel cell and an output detector arranged to detect output information regarding an output of the fuel cell. With this arrangement, the power generation information is provided by one of the third temperature information and the output information. In this case, the fuel cell system sets the predetermined value based on the third temperature information or the output information. Since the temperature of fuel which is discharged from the fuel cell, namely the difference information, increases with the fuel cell temperature, the fuel cell system can set an appropriate value as the predetermined value based on the third temperature information. Also, since the temperature of fuel which is discharged from the fuel cell, namely the difference information, increases with the output of the fuel cell, it is also possible to set an appropriate value as the predetermined value based on the output information.

Preferably, the fuel cell system further includes an operation state determination section arranged to determine whether or not the fuel cell is in normal operation where constant power generation is possible, based on power generation information regarding a state of power generation in the fuel cell. With this arrangement, the first temperature detector and the second temperature detector perform their respective detections in accordance with a result of determination by the operation state determination section. In this case, the fuel cell system determines whether or not the current operation is normal operation, and detects the first temperature information and the second temperature information if the fuel cell system is in normal operation. The fuel cell temperature is stable in normal operation, and so are the first temperature information and the second temperature information. Therefore, by using the first temperature information and the second temperature information which are detected in normal operation, the fuel cell system can obtain appropriate difference information, and can determine an abnormality in the fuel supply device appropriately.

Further preferably, the fuel is provided by aqueous fuel solution, and the fuel cell system further includes a concentration detector arranged to detect concentration information regarding a concentration of the aqueous fuel solution. With this arrangement, the power generation information is provided by the concentration information. Fuel cell systems which use aqueous fuel solution for power generation usually perform a temperature raising operation for raising rapidly the fuel cell temperature before they start normal operation. In the temperature raising operation, the aqueous fuel solution concentration is set in a high-concentration temperature-raising range whereas in the normal operation thereafter, the aqueous fuel solution concentration is set in a lower-concentration normal range. By determining whether or not the concentration information falls in the normal range, the fuel cell system can easily determine whether or not the current operation is normal operation.

Further, preferably, the fuel cell system further includes at least one of a third temperature detector arranged to detect third temperature information regarding a temperature of the fuel cell and an output detector arranged to detect output information regarding an output of the fuel cell. With this arrangement, the power generation information is provided by one of the third temperature information and the output information. In this case, the fuel cell system determines whether or not the fuel cell system is in normal operation, based on the third temperature information or the output information. Since the fuel cell temperature reaches a predetermined temperature in normal operation, the fuel cell system can easily determine whether or not the current state is normal operation by determining whether or not the third temperature information is not lower than the predetermined temperature. Likewise, since the fuel cell output is not lower than a predetermined output in normal operation, the fuel cell system can also easily determine whether or not the current state is in normal operation by determining whether or not the output information is not smaller than the predetermined output.

Preferably, the fuel cell system further includes an output control section arranged and programmed to control an output of the fuel supply device based on a result of determination by the abnormality determination section. In this case, the output control section controls the fuel supply device so as to increase the output of the fuel supply device if an abnormality is detected. By controlling the fuel supply device in such a way as described, the fuel cell system can reduce deterioration of the fuel cell caused by non-uniform distribution of the fuel when the fuel supply device has a decreased output due to deterioration. Such a control also reduces decrease in the output of the fuel cell.

Further preferably, the fuel cell system further includes a stoppage control section arranged and programmed to stop power generation in the fuel cell based on a result of determination by the abnormality determination section and a state of the output control of the fuel supply device by the output control section. If it is determined that the fuel supply device has an abnormality while the output control section controls the fuel supply device so as to increase the output (to a maximum output, for example,) of the fuel supply device, power generation in the fuel cell is stopped. In this case, it is likely that the fuel supply device is not in operation or the deterioration of the fuel supply device has reached a substantially advanced state. By stopping power generation in the fuel cell, the fuel cell system can reduce deterioration of the fuel cell caused by non-uniform distribution of the fuel.

Further, preferably, the fuel cell system further includes a prohibition control section arranged and programmed to prohibit power generation in the fuel cell after a stoppage of power generation in the fuel cell by the stoppage control section. Once power generation in the fuel cell has been stopped following the determination that there is an abnormality, power generation thereafter is prohibited. With this arrangement, the fuel cell system can reduce deterioration of the fuel cell caused by non-uniform distribution of the fuel more reliably.

Preferably, the fuel cell system further includes a notifier arranged to provide notification of a result of determination made by the abnormality determination section. Notifying an abnormality of the fuel supply device increases the convenience of the fuel cell system.

Fuel cell systems to be mounted on transportation equipment should desirably be compact, with a small number of components. According to a preferred embodiment of the present invention, it is possible to determine an abnormality in the fuel supply device without the need to add or use additional detectors for abnormality determination purpose, and it is not necessary to increase the number of components and therefore it is possible to make the system compactly. Thus, preferred embodiments of the present invention can be utilized suitably for transportation equipment.

It should be noted here that "the first temperature information" and "the second temperature information" do not only include fuel temperatures but may also include other information which has a corresponding relationship with the fuel temperature. The "difference information" does not only include a temperature difference between the fuel which is supplied to the fuel cell and the fuel which is discharged from the fuel cell, but may also include other information which has a corresponding relationship with the temperature difference. The "concentration information" does not only include the aqueous fuel solution concentration but may also include other information which has a corresponding relationship with the aqueous fuel solution concentration. The "third temperature information" does not only include the fuel cell temperature but may also include other information which has a corresponding relationship with the fuel cell temperature. The "output information" does not only include a fuel cell output but may also include other information which has a corresponding relationship with the fuel cell output.

The above-described and other elements, features, characteristics, aspects, steps and advantages of the present invention will become clearer from the following detailed description of preferred embodiments of the present invention to be made with reference to the attached drawings.

BRIEF DESCRIPTION OF THE DRAWINGS

FIG. 7 is a graph showing changes in aqueous solution concentration, fuel pump operation timing, and changes in inflow outflow temperature difference, in normal operation.

FIG. 8A shows a case where setting of a predetermined value is based on aqueous solution concentration; FIG. 8B shows a case where setting of a predetermined value is based on a cell temperature; and FIG. 8C shows a case where setting of a predetermined value is based on a cell stack output.

FIG. 11 is a graph for describing a relationship between cell temperature and inflow outflow temperature difference.

DETAILED DESCRIPTION OF THE PREFERRED EMBODIMENTS

Hereinafter, preferred embodiments of the present invention will be described with reference to the drawings.

The preferred embodiments are cases where a fuel cell system 100 according to the present invention is equipped in a motorbike 10 as an example of transport equipment.

Figure 1:
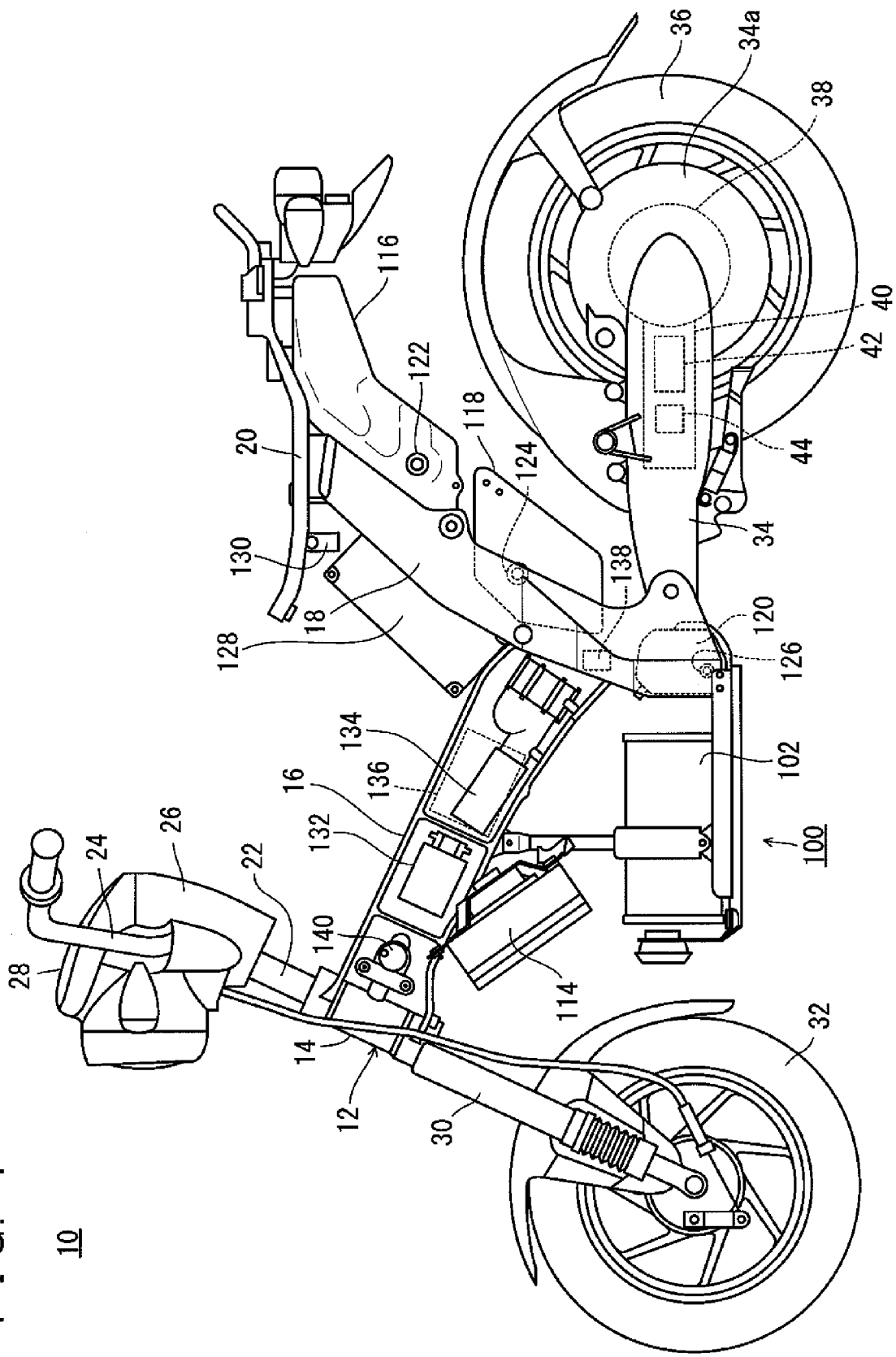
FIG. 1 is a left side view showing a motorbike according to a preferred embodiment of the present invention.

FIG. 1 is a left side view showing the motorbike 10. Referring to FIG. 1, the description will first cover the motorbike 10. It is noted here that the terms left and right, front and rear, up and down as used in the preferred embodiments of the present invention are determined from the normal state of riding a motorbike, i.e., as viewed by the driver sitting on the seat of the motorbike 10, facing toward a handle 24.

As shown in FIG. 1, the motorbike 10 includes a vehicle frame 12. The vehicle frame 12 includes a head pipe 14, a front frame 16 extending in a rearward and downward direction from the head pipe 14, and a rear frame 18 connected with a rear end of the front frame 16 and rising in a rearward and upward direction. A seat frame 20 is fixed to an upper end of the rear frame 18, for installation of an unillustrated seat.

A steering shaft 22 is pivotably inserted into the head pipe 14. A handle support 26 is provided at an upper end of the steering shaft 22, to which the handle 24 is fixed. A display/operation board 28 is provided on an upper end of the handle support 26.

Figure 3:
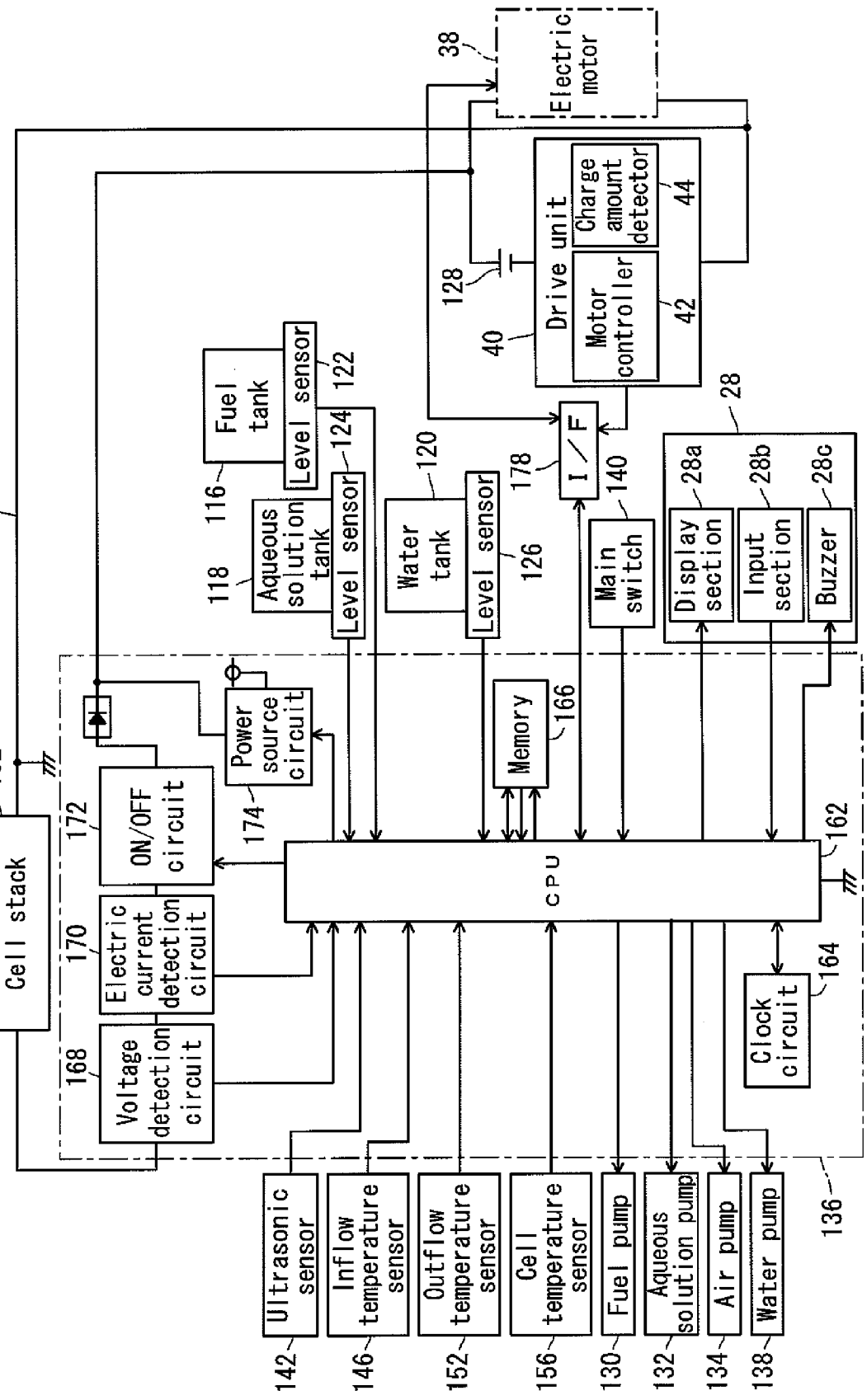
FIG. 3 is a block diagram showing an electrical configuration of a fuel cell system according to a preferred embodiment of the present invention.

Referring also to FIG. 3, the display/operation board 28 includes a display section 28a including, e.g., a liquid crystal display, etc., for providing a various kinds of information; an input section 28b for use in inputting instructions and various kinds of information; and a buzzer 28c for providing notification of an abnormality.

As shown in FIG. 1, a pair of left and right front forks 30 is provided at a bottom end of the steering shaft 22. Each of the front forks 30 includes a bottom end which rotatably supports a front wheel 32.

The rear frame 18 includes a lower end which pivotably supports a swing arm (rear arm) 34. The swing arm 34 has a rear end 34a incorporating an electric motor 38 of an axial gap type, for example, which is connected with a rear wheel 36 to drive and rotate the rear wheel 36. The swing arm 34 incorporates a drive unit 40 which is electrically connected with the electric motor 38. The drive unit 40 includes a motor controller 42 arranged and programmed to control rotation of the electric motor 38, and a charge-amount detector 44 which detects an amount of electric charge in a secondary battery 128 (to be described later).

The motorbike 10 as described is equipped with a fuel cell system 100 along the vehicle frame 12. The fuel cell system 100 generates electric energy to drive the electric motor 38, system components, etc.

Hereinafter, the fuel cell system 100 will be described with reference to FIG. 1 and FIG. 2.

Figure 2:
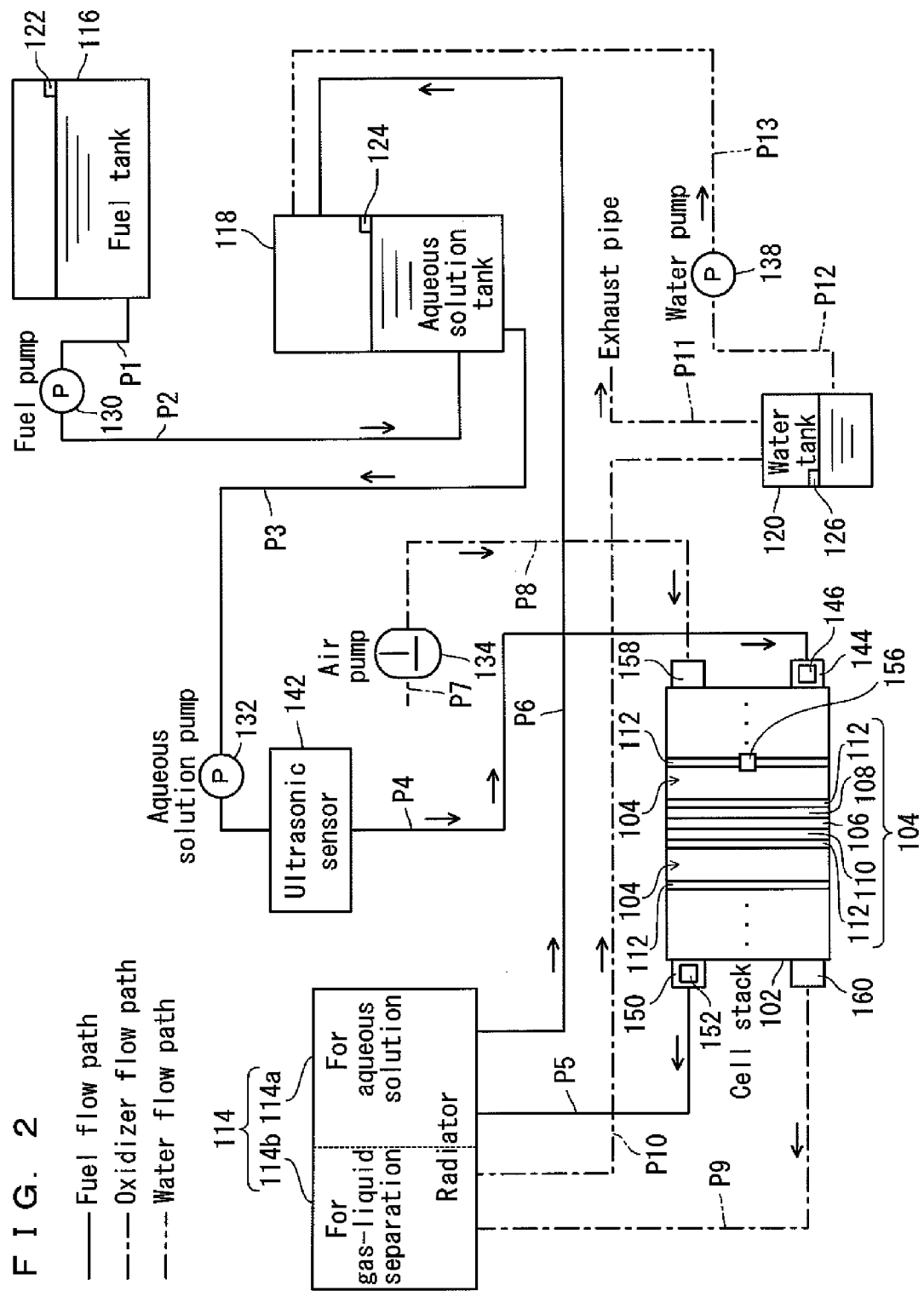
FIG. 2 is a system diagram showing piping of a fuel cell system according to a preferred embodiment of the present invention.

FIG. 2 is a system diagram showing piping of the fuel cell system 100.

The fuel cell system 100 is a direct methanol fuel cell system which uses methanol (an aqueous solution of methanol) directly without reformation, for generation of the electric energy (power generation).

The fuel cell system 100 includes a fuel-cell cell-stack (hereinafter simply called cell stack) 102. As shown in FIG. 1, the cell stack 102 is suspended from the front frame 16, and disposed below the front frame 16.

As shown in FIG. 2, the cell stack 102 includes a plurality of fuel cells (individual fuel cells) 104 each capable of generating electric power through electrochemical reactions of hydrogen ions based on methanol and oxygen (oxidizer). These fuel cells 104 are stacked and connected in series.

Each fuel cell 104 includes an electrolyte film 106 provided by a solid polymer film; a pair of an anode (fuel electrode) 108 and a cathode (air electrode) 110 opposed to each other, sandwiching the electrolyte film 106 in between; and a pair of separators 112 opposed to each other, sandwiching an MEA (Membrane Electrode Assembly) which is an assembly including the electrolyte film 106, the anode 108 and the cathode 110.

The anode 108 includes a platinum catalyst layer provided on the side closer to the electrolyte film 106, and an electrode provided on the side closer to the separator 112. The cathode 110 includes a platinum catalyst layer provided on the side closer to the electrolyte film 106, and an electrode provided on the side closer to the separator 112.

The separator 112 is made of an electrically conductive material such as a carbon composite material, and is used as a common component in two mutually adjacent fuel cells 104. The separator 112 has a main surface which faces the anode 108 and includes a serpentine groove arranged to supply the electrode of the anode 108 with aqueous methanol solution. Likewise, the separator 112 has a main surface which faces the cathode 110 and includes a serpentine groove arranged to supply the electrode of the cathode 110 with air as an oxygen-(oxidizer-) containing gas.

As shown in FIG. 1, a radiator unit 114 is disposed below the front frame 16, above the cell stack 102.

As shown in FIG. 2, the radiator unit 114 includes an aqueous solution radiator 114a and a gas-liquid separation radiator 114b integrally with each other. The radiators 114a, 114b are each provided with an unillustrated fan.

Between a pair of plate members of the rear frame 18, a fuel tank 116, an aqueous solution tank 118 and a water tank 120 are disposed in this order from top to down.

The fuel tank 116 contains a methanol fuel (high concentration aqueous solution of methanol) having a high concentration level (preferably containing methanol at approximately 50 wt %) which is used as a fuel for the electrochemical reaction in the cell stack 102. The aqueous solution tank 118 contains aqueous methanol solution which is a solution of the methanol fuel from the fuel tank 116 diluted to a concentration (preferably containing methanol at approximately 2 wt %) appropriate for the electrochemical reactions in the cell stack 102. The water tank 120 contains water which is to be supplied to the aqueous solution tank 118.

The fuel tank 116 is provided with a level sensor 122. The aqueous solution tank 118 is provided with a level sensor 124, and the water tank 120 is provided with a level sensor 126. The level sensors 122, 124 and 126 are floating sensors, for example, which detect the height of the liquid surface (liquid level) in the respective tanks.

As shown in FIG. 1, in front of the fuel tank 116, above the front frame 16, is a secondary battery 128. The secondary battery 128 stores electric energy generated by the cell stack 102, and supplies the stored electric energy to the electric components in response to commands from a controller 136 (to be described later). Above the secondary battery 128, a fuel pump 130 is disposed.

In the left-hand side storage space of the front frame 16, an aqueous solution pump 132 and an air pump 134 are housed. In the right-hand side storage space of the front frame 16, a controller 136 and a water pump 138 are disposed.

A main switch 140 is disposed in the front frame 16. Turning on the main switch 140 gives the controller 136 an operation start command whereas turning off the main switch 140 gives the controller 136 an operation stop command. If the main switch 140 is turned off while the cell stack 102 is in power generating operation, the controller 136 is given an operation stop command and a power generation stop command.

As shown in FIG. 2, the fuel tank 116 and the fuel pump 130 are connected with each other by a pipe P1. The fuel pump 130 and the aqueous solution tank 118 are connected with each other by a pipe P2. The aqueous solution tank 118 and the aqueous solution pump 132 are connected with each other by a pipe P3. The aqueous solution pump 132 and the cell stack 102 are connected with each other by a pipe P4.

The pipe P4 is provided with an ultrasonic sensor 142 arranged to detect a concentration of aqueous methanol solution (a methanol ratio in aqueous methanol solution). The ultrasonic sensor 142 detects a propagation time (propagation velocity) of an ultrasonic wave, which varies in accordance with aqueous methanol solution concentration, in the form of a voltage value. Based on the voltage value, the controller 136 detects a concentration of the aqueous methanol solution. The pipe P4 is connected with a pipe connecting member 144, which is provided in the cell stack 102.

Figure 4:
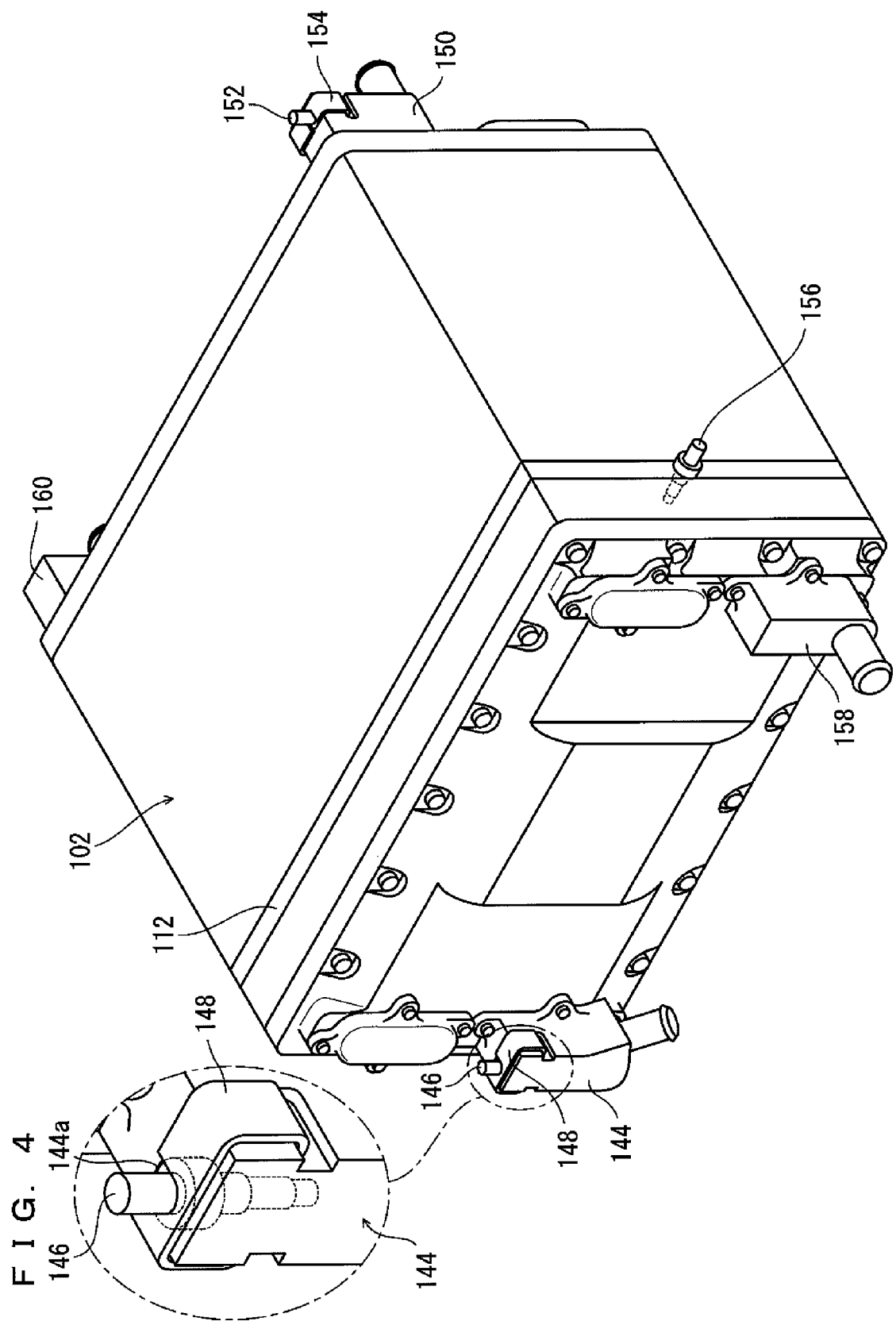
FIG. 4 is a diagram showing how temperature sensors are provided in a cell stack.

FIG. 4 is a diagram showing how various temperature sensors are provided in a cell stack 102. Referring also to FIG. 4, the pipe connecting member 144 provides an inlet to the anode and is provided with an inflow temperature sensor 146. The inflow temperature sensor 146 is inserted into an insertion hole 144a provided in the pipe connecting member 144. The insertion hole 144a has an opening in an upper surface of the pipe connecting member 144, and communicates with a flow path inside the pipe connecting member 144. The inflow temperature sensor 146 has a generally C shaped stopper 148, which has its two ends hooked into grooves provided on the sides of the pipe connecting member 144, thereby being fixed to the pipe connecting member 144. The pipe connecting member 144 is preferably made of a highly heat-insulating material such as synthetic resin, an example of which is polyether ether ketone (PEEK: registered trademark) so that detection by the inflow temperature sensor 146 will not be unduly affected by ambient temperature (outside air temperature) changes.

Returning to FIG. 2, the cell stack 102 and the aqueous solution radiator 114a are connected with each other by a pipe P5 whereas the radiator 114a and the aqueous solution tank 118 are connected with each other by a pipe P6. The pipe P5 is connected with a pipe connecting member 150 provided in the cell stack 102. The pipe connecting member 150 provides an anode outlet, and like the pipe connecting member 144, is preferably made of a highly heat-insulating material such as synthetic resin, an example of which is polyether ether ketone (PEEK: registered trademark).

As shown in FIG. 4, the pipe connecting member 150 is provided, like the pipe connecting member 144, with an outflow temperature sensor 152. The outflow temperature sensor 152 is fixed to the pipe connecting member 150 by a stopper 154, which is similar to the stopper 148.

The cell stack 102 is also provided with a cell temperature sensor 156 arranged to detect temperatures of the fuel cell 104. The cell temperature sensor 156 is inserted into an insertion hole provided in a side surface of the separator 112, and is fixed to the separator 112 with an adhesive, for example. It should be noted here that the cell stack 102 preferably includes a plurality of separators 112 and FIG. 4 shows only one separator 112 which is provided with the cell temperature sensor 156.

Returning to FIG. 2, when the fuel pump 130 is driven, methanol fuel in the fuel tank 116 is supplied to the aqueous solution tank 118 via the pipe P1, the fuel pump 130 and the pipe P2.

Also, when the aqueous solution pump 132 is driven, aqueous methanol solution in the aqueous solution tank 118 is supplied to each of the fuel cells 104 in the cell stack 102 via the pipe P3, the aqueous solution pump 132, the pipe P4, the ultrasonic sensor 142 and the pipe connecting member 144. Simultaneously with this, supplied aqueous methanol solution (used aqueous methanol solution) in each fuel cell 104 is discharged from the cell stack 102 via the pipe connecting member 150. The aqueous methanol solution discharged from the cell stack 102 is returned to the aqueous solution tank 118 via the pipe P5, the radiator 114a and the pipe P6. In other words, circulatory supply of aqueous methanol solution takes place from the aqueous solution tank 118 to the cell stack 102 by driving the aqueous solution pump 132.

The aqueous solution pump 132 in its normal condition preferably has a maximum output (maximum amount of discharge) of about 2.5 L/min (liters per minute), for example. Also, when the cell stack 102 is in its normal operation where constant power generation is possible, the aqueous solution pump 132 works at a preset output (hereinafter called normal output), which is preferably about 80% of the maximum output, for example.

The inflow temperature sensor 146 detects temperatures of aqueous methanol solution flowing in the pipe connecting member 144. In other words, the inflow temperature sensor 146 detects temperatures of aqueous methanol solution (hereinafter called inflow temperature) which is introduced into the cell stack 102 as a supply to each fuel cell 104. The outflow temperature sensor 152 detects temperatures of aqueous methanol solution flowing in the pipe connecting member 150. In other words, the outflow temperature sensor 152 detects temperatures of aqueous methanol solution (hereinafter called outflow temperature) which comes out of each fuel cell 104 and then from the cell stack 102.

The above-described pipes P1 through P6 serve primarily as a flow path of the fuel.

The air pump 134 is connected with a pipe P7. The air pump 134 and the cell stack 102 are connected with each other via a pipe P8. The pipe P8 is connected with a pipe connecting member 158 in the cell stack 102. Also, the cell stack 102 and the gas-liquid separation radiator 114b are connected with each other via the pipe P9. The radiator 114b and the water tank 120 are connected with each other via a pipe P10. The water tank 120 has its exhaust outlet provided with a pipe (exhaust pipe) P11. The pipe P9 is connected with a pipe connecting member 160 in the cell stack 102.

When the air pump 134 is driven, air as an oxygen- (oxidizer-) containing gas is supplied from outside to each fuel cell 104 in the cell stack 102 via the pipe P7, the air pump 134, the pipe P8 and the pipe connecting member 158 which serves as a cathode inlet. Simultaneously with this, supplied air (used air) in each fuel cell 104 in the cell stack 102 is discharged from the cell stack 102 via the pipe connecting member 160 which provides a cathode outlet. After leaving the cell stack 102, the air (exhaust) is discharged outside via the pipe P9, the radiator 114b, the pipe P10, the water tank 120 and the pipe P11. Water in the exhaust is collected in the water tank 120.

The above-described pipes P7 through P11 serve primarily as a flow path of the oxidizer.

The water tank 120 and the water pump 138 are connected with each other via the pipe P12. The water pump 138 and the aqueous solution tank 118 are connected with each other via the pipe P13. When driving the water pump 138, water in the water tank 120 is supplied to the aqueous solution tank 118 via the pipe P12, the water pump 138 and the pipe P13.

The above-described pipes P12, P13 serve as a flow path of water.

Next, reference will be made to FIG. 3 to describe an electric configuration of the fuel cell system 100.

FIG. 3 is a block diagram showing an electrical configuration of a fuel cell system 100.

The controller 136 of the fuel cell system 100 includes a CPU 162, a clock circuit 164, a memory 166, a voltage detection circuit 168, an electric current detection circuit 170, an ON/OFF circuit 172, and a power source circuit 174.

The CPU 162 performs necessary calculations, and controls operations of the fuel cell system 100. The clock circuit 164 provides the CPU 162 with a clock signal. The memory 166, which is provided by, e.g., an EEPROM, stores programs and data, calculation data, etc., so as to control the operations of the fuel cell system 100. The voltage detection circuit 168 detects a voltage in the cell stack 102. The electric current detection circuit 170 detects an electric current which passes through the electric circuit 176. The ON/OFF circuit 172 opens and closes the electric circuit 176. The power source circuit 174 provides the electric circuit 176 with a predetermined voltage.

The CPU 162 of the controller 136 is supplied with input signals from the main switch 140 and the input section 28b. The CPU 162 is also supplied with detection signals from the level sensors 122, 124, 126 and the ultrasonic sensor 142, temperature detection values from the inflow temperature sensor 146, the outflow temperature sensor 152 and the cell temperature sensor 156, voltage detection values from the voltage detection circuit 168, and electric current detection values from the electric current detection circuit 170. Further, the CPU 162 is supplied with charge-amount detection values from the charge-amount detector 44 via an interface circuit 178.

The CPU 162 obtains a concentration of aqueous methanol solution from a table which is stored in advance in the memory 166, based on a voltage value from the ultrasonic sensor 142. Thus, a concentration of aqueous methanol solution supplied to the cell stack 102 is detected. Also, the CPU 162 calculates an absolute value (hereinafter called inflow outflow temperature difference) of a difference between an inflow temperature from the inflow temperature sensor 146 and an outflow temperature from the outflow temperature sensor 152. The CPU 162 also calculates an output of the cell stack 102, using a voltage detection value from the voltage detection circuit 168 and an electric current input value from the electric current detection circuit 170. Thus, an output of the cell stack 102 is detected. Further, the CPU 162 calculates a charge rate of the secondary battery 128, using a charge amount detection value given as an input and a capacity of the secondary battery 128.

The CPU 162 controls system components such as the fuel pump 130, the aqueous solution pump 132, the air pump 134, and the water pump 138; the display section 28a arranged to provide notification of the driver of various information; the buzzer 28c arranged to notify the driver of an abnormality; and the ON/OFF circuit 172 which opens/closes the electric circuit 176.

The memory 166, which serves as a storage device, stores programs for executing procedures shown in FIG. 5, FIG. 6, FIG. 8A through FIG. 8C, FIG. 13 and FIG. 14; various calculation values; various detection values; various threshold values; various flags; various tables; and the like.

In the present preferred embodiment, the fuel supply device includes the aqueous solution pump 132. The first temperature detector includes the inflow temperature sensor 146 and detects the inflow temperature as the first temperature information. The second temperature detector includes the outflow temperature sensor 152 and detects the outflow temperature as the second temperature information. The CPU 162 also functions as the abnormality determination section, the setting section, the operation state determination section, the output control section, the stoppage control section and the prohibition control section. The inflow outflow temperature difference obtained by the CPU 162 represents the difference information. The concentration detector includes the ultrasonic sensor 142 and the CPU 162. The aqueous methanol solution concentration detected by the CPU 162 represents the concentration information. The concentration adjuster includes the fuel pump 130 and the CPU 162. The third temperature detector includes the cell temperature sensor 156, and detects the temperature of fuel cell 104 as the third temperature information. The output detector includes the CPU 162, the voltage detection circuit 168 and the electric current detection circuit 170. An output (wattage) of the cell stack 102 detected by the CPU 162 represents the output information. The buzzer 28c represents the notifier.

Next, reference will be made to FIG. 5 and FIG. 6 to describe an example of power generating procedure of the fuel cell system 100. The power generating procedure shown in FIG. 5 and FIG. 6 is started when the main switch 140 is in the ON state and the secondary battery 128 has a lower charge rate than a lower limit value (preferably about 40%, for example).

Figure 5:
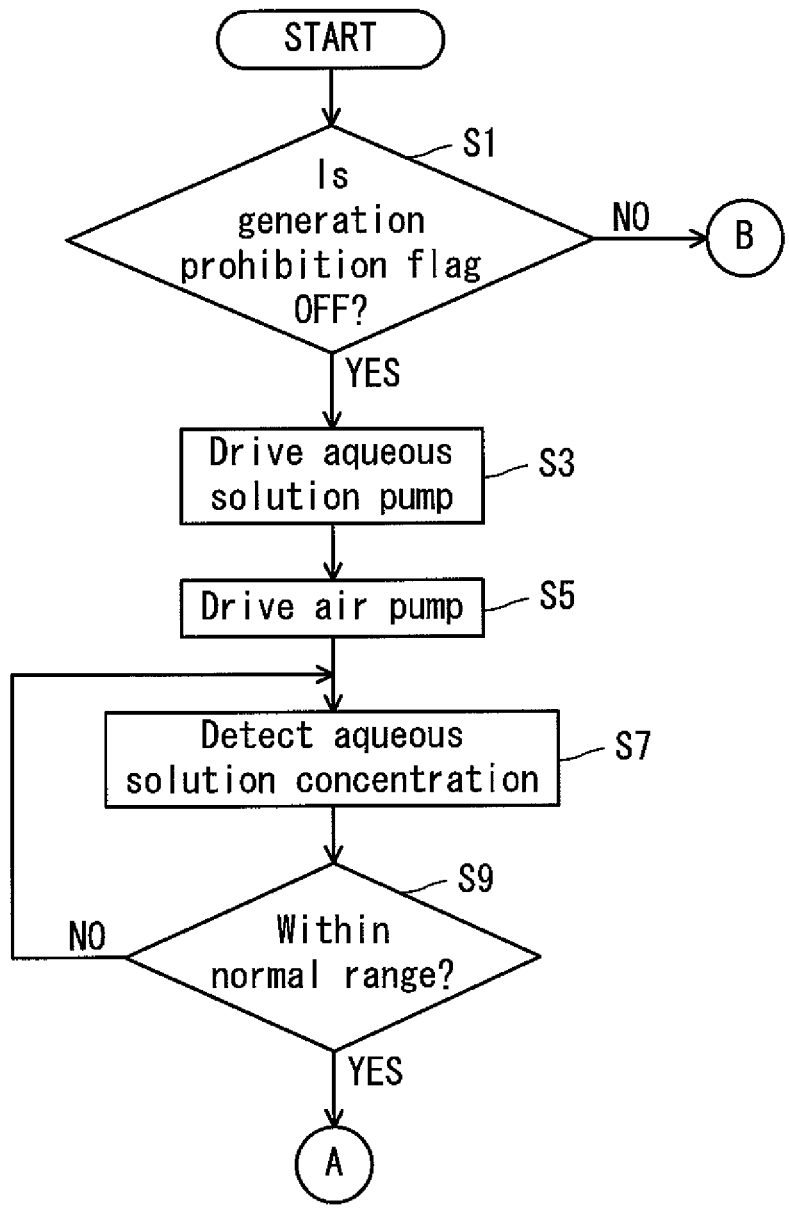
FIG. 5 is a flowchart showing an example of power generating procedure in a fuel cell system according to a preferred embodiment of the present invention.
Figure 6:
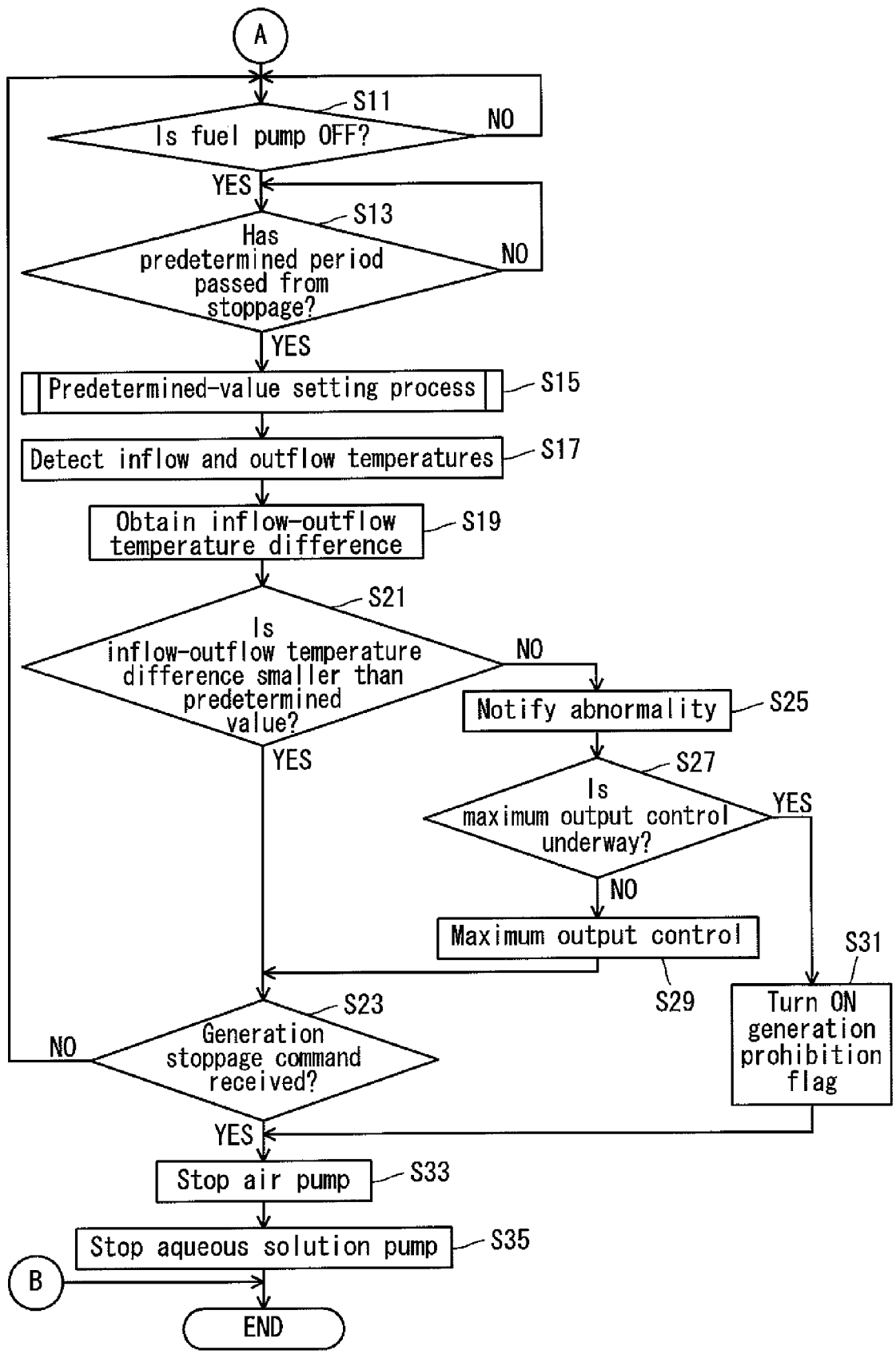
FIG. 6 is a flowchart showing a continuation from FIG. 5.

As shown in FIG. 5, in Step S1, the CPU 162 first determines whether or not a generation prohibition flag in the memory 166 is in the OFF state. If the generation prohibition flag is OFF, the CPU 162 starts operation of the aqueous solution pump 132 (Step S3), thereby starting supply of aqueous methanol solution to the anode 108 in each fuel cell 104. Following Step S3, the CPU 162 starts operation of the air pump 134 (Step S5), thereby starting supply of air, which contains oxygen (oxidizer), to the cathode 110 in each fuel cell 104.

At the anode 108 in each fuel cell 104, methanol in the supplied aqueous methanol solution makes chemical reactions with water, to produce carbon dioxide and hydrogen ions. The generated hydrogen ions flows to the cathode 110 via the electrolyte film 106, electrochemically reacts with oxygen which is contained in the air supplied to the cathode 110, and produces water (water vapor) and electric energy. In other words, power generation takes place in the cell stack 102. Power from the cell stack 102 is utilized to charge the secondary battery 128, to drive the motorbike 10, and other purposes.

Heat which is generated in the reactions raises the temperature of the cell stack 102, and along with the increase in temperature, the output of the cell stack 102 increases. At a temperature of approximately 60° C., the cell stack 102 becomes able to make constant power generation and thereby to maintain an output not lower than a predetermined output (preferably 600 W). When the cell stack 102 becomes able to generate power constantly as described, the ON/OFF circuit 172 is turned ON to connect the cell stack 102 with the electric motor 38 and the secondary battery 128, whereupon the fuel cell system 100 shifts to its normal operation.

If aqueous methanol solution has a high concentration, there is a large amount of methanol crossover from the anode 108 to the cathode 110 via the electrolyte film 106, which increases methanol burning reaction (decomposition into carbon dioxide and water) at the cathode 110. Therefore, a higher aqueous methanol solution concentration promotes temperature increase in the cell stack 102. This principle is utilized during a temperature raising operation which precedes normal operation, until the cell stack 102 attains a temperature required for normal operation (hereinafter called normal operation temperature). During the temperature raising operation, aqueous methanol solution concentration is adjusted to be higher than in normal operation. Specifically, for normal operation, aqueous methanol solution concentration is adjusted in a preferred range of about 1.6 wt % through about 2.0 wt %, for example (hereinafter called normal range) whereas in the temperature raising operation, concentration is adjusted in a preferred range of about 3.2 wt % through about 4.0 wt %, for example.

After Step S5, the CPU 162 detects an aqueous methanol solution concentration (Step S7) and determines whether or not the detected concentration falls in the normal range (between about 1.6 wt % and about 2.0 wt % in the present preferred embodiment) (Step S9). Thus, it is determined whether or not the current state of operation is the normal operation. If the aqueous methanol solution concentration falls out of the normal range, the process returns to Step S7, and waits until the normal range is reached. In other words, the process waits until the system shifts to normal operation. When the aqueous methanol solution concentration comes in the normal range, the process goes to Step S11 (see FIG. 6). In other words, the process goes to Step S11 if the system has shifted to normal operation.

As shown in FIG. 6, in Step S11, the CPU 162 determines whether or not the fuel pump 130 is not in operation. As the cell stack 102 consumes methanol, aqueous methanol solution concentration in the aqueous solution tank 118 decreases. In order to maintain the aqueous methanol solution concentration within the normal range (preferably between about 1.6 wt % and about 2.0 wt %, for example, in this preferred embodiment), a concentration adjusting procedure is carried out along with the power generating procedure.

FIG. 7 is a graph showing changes in aqueous solution concentration, operation timing of the fuel pump 130, and changes in the inflow outflow temperature difference, during normal operation.

As shown in FIG. 7, the concentration adjusting procedure is started when the aqueous methanol solution concentration has reached a lower limit value (preferably about 1.6 wt %, for example, in the present preferred embodiment) of the normal range, upon which the CPU 162 causes the fuel pump 130 to drive in order to bring the aqueous methanol solution concentration to an upper limit value (preferably about 2.0 wt %, for example, in the present preferred embodiment) of the normal range. During the concentration adjusting procedure (while the fuel pump 130 is in operation), aqueous methanol solution concentration varies in the aqueous solution tank 118, so the concentration of aqueous methanol solution supplied to the cell stack 102 increases in a fluctuating manner. As understood, the aqueous solution concentration change is unstable while the fuel pump 130 is in operation.

Returning to FIG. 6, the process waits until Step S11 determines that the fuel pump 130 is not in operation. Then, the process waits further, until a predetermined period has been elapsed from the stoppage of the fuel pump 130 (Step S13). This step ensures that the aqueous solution concentration change has been stabilized.

As shown in FIG. 7, the predetermined period is a period which is necessary for the inflow outflow temperature difference to attain a maximum value, starting from stoppage of the fuel pump 130 when the aqueous solution pump 132 is operating at its normal output (preferably about 80% of its maximum output, for example, in the present preferred embodiment). The predetermined period as described is a value which was obtained from measuring inflow outflow temperature difference changes when the cell stack 102 is operating at a predetermined output (preferably about 600 W, for example, in the present preferred embodiment) at a normal operation temperature (preferably about 60° C., for example, in the present preferred embodiment) and the aqueous solution pump 132 is operating at its normal output. The predetermined period is stored in the memory 166 in advance.

As understood from FIG. 7, there is a time lag between the time when the aqueous methanol solution concentration attains the upper limit value and the time when the inflow outflow temperature difference attains its maximum value. For this reason, until the inflow outflow temperature difference has attained the maximum value, two identical concentration values of aqueous methanol solution (see Points C1 and C2) take different inflow outflow temperature differences (see Points T1 and T2). In other words, the aqueous methanol solution concentration and the inflow outflow temperature difference are not in one-to-one relationship from the time when the fuel pump 130 is stopped to the time when the inflow outflow temperature difference attains its maximum value. Waiting until the predetermined period has elapsed ensures that a detected concentration has a one-to-one relationship with the inflow outflow temperature difference.

Returning to FIG. 6, when Step S13 determines that the predetermined period has elapsed, the CPU 162 performs a process of setting a predetermined value which is a value to be compared to the inflow outflow temperature difference (Step S15).

Figure 8A:
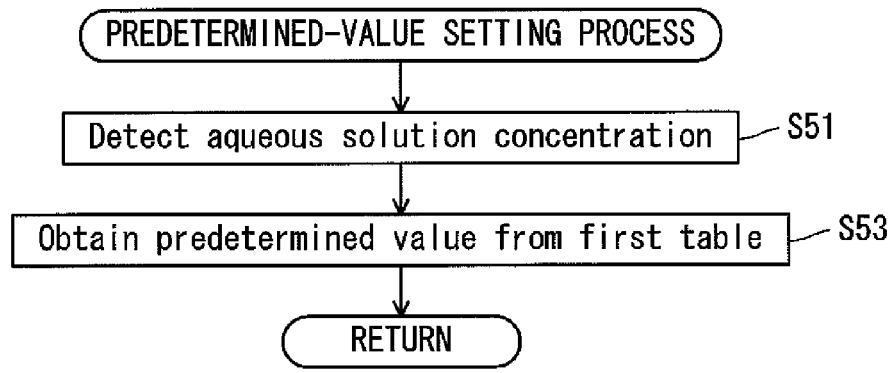
FIG. 8A through FIG. 8C are flowcharts showing predetermined-value setting processes.

Reference will be made to FIG. 8A now to describe a predetermined-value setting process in Step S15.

First, the CPU 162 detects aqueous methanol solution concentration using the ultrasonic sensor 142 (Step S51). The aqueous methanol solution concentration detected in this step has a one-to-one relationship with the inflow outflow temperature difference as described above. After Step S51, the CPU 162 obtains a temperature value which corresponds to the detected concentration from a first table, as the predetermined value (Step S53).

The first table used in Step S53 is stored in the memory 166 in advance. An example of the first table is shown as Table 1 below. Also, a graph which shows a relationship between the aqueous methanol solution concentration and the inflow outflow temperature difference is given in FIG. 9, and a graph which shows a relationship between the output from the aqueous solution pump 132 and the inflow outflow temperature difference is given in FIG. 10.

TABLE 1

| Aqueous Solution Concentration [wt %] | Temperature [° C.] |
| --- | --- |
| 2.5 | 15.2 |
| 2.6 | 15.6 |
| 2.7 | 16.0 |
| 2.8 | 16.5 |

TABLE 1-continued

| Aqueous Solution Concentration [wt %] | Temperature [° C.] |
| --- | --- |
| 2.9 | 17.0 |
| 3.0 | 17.3 |
| 3.1 | 17.8 |
| 3.2 | 18.3 |
| 3.3 | 18.8 |
| 3.4 | 19.3 |
| 3.5 | 19.7 |

As has been described earlier, the temperature of the cell stack 102 increases with an increase in aqueous methanol solution concentration, and the outflow temperature also increase with the increase in aqueous methanol solution concentration. Therefore, as shown in FIG. 9, the inflow outflow temperature difference, which is a difference between the inflow temperature and the outflow temperature, increases with the increase in the aqueous methanol solution concentration (substantially in proportion thereto).

Figure 9:
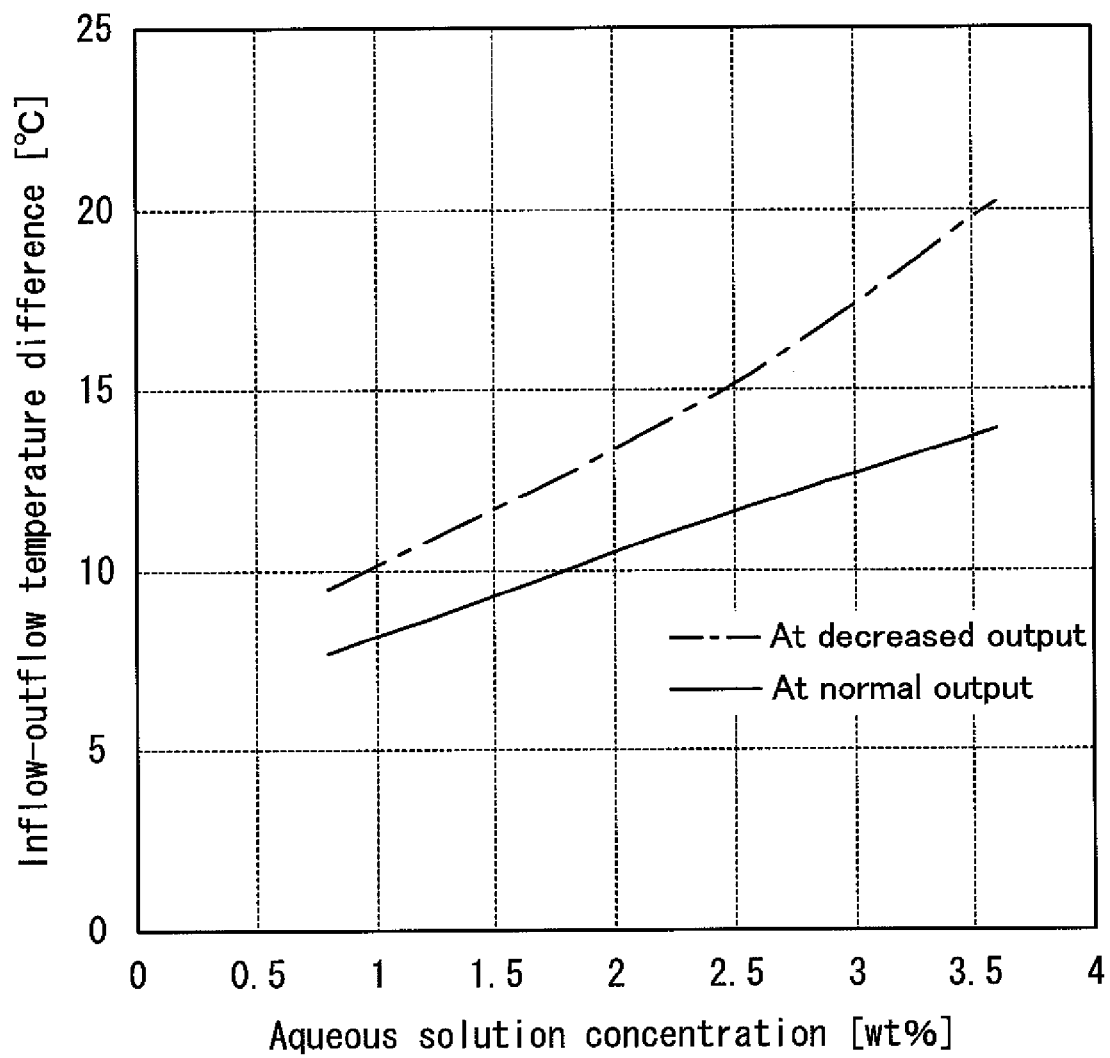
FIG. 9 is a graph for describing a relationship between aqueous solution concentration and inflow outflow temperature difference.

In FIG. 9, solid lines show a relationship between the aqueous solution concentration and the inflow outflow temperature difference when the aqueous solution pump 132 is operating at its normal output (preferably about 80%, for example, of its maximum output in the present preferred embodiment). Also, in FIG. 9, alternate long and short dash lines show a relationship between the aqueous solution concentration and the inflow outflow temperature difference when the aqueous solution pump 132 is operating at about 70% output of its maximum output. In other words, FIG. 9 shows a relationship between the aqueous solution concentration and the inflow outflow temperature difference under normal output state in the solid lines, and a relationship between the aqueous solution concentration and the inflow outflow temperature difference under a low output state in the alternate long and short dash lines.

Figure 10:
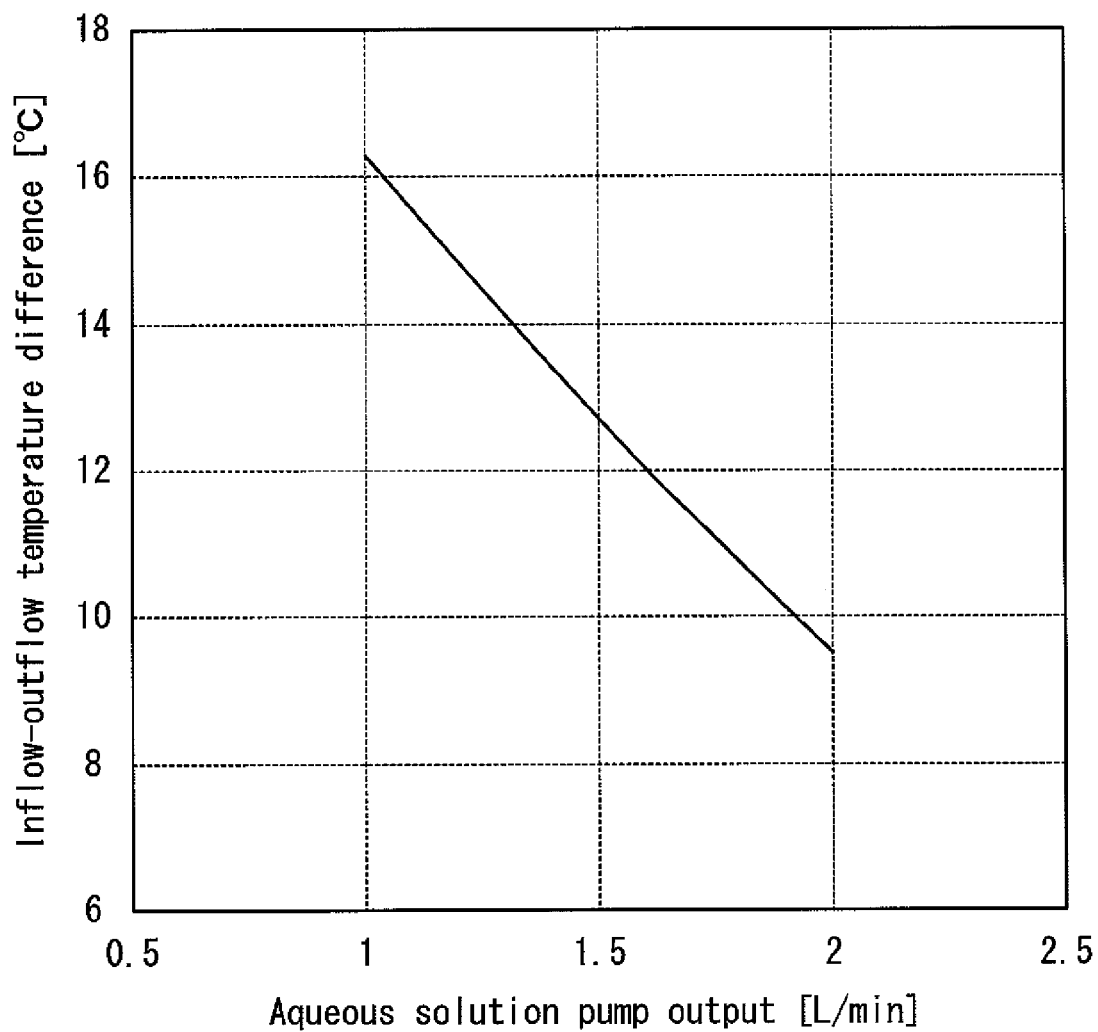
FIG. 10 is a graph for describing a relationship between aqueous solution pump output and inflow outflow temperature difference.

As shown in FIG. 10, the inflow outflow temperature difference also increases when there is an abnormality such as malfunction and deterioration which causes a decrease in the output of (the amount of solution pumped by) the aqueous solution pump 132. This is because the aqueous methanol solution stays at the cell stack 102 for an extended period of time and the aqueous methanol solution is heated in the cell stack 102 for an extended period of time. For this reason, the inflow outflow temperature difference is greater in the case indicated by the alternate long and short dash lines in FIG. 9 than in the case indicated by the solid lines in FIG. 9.

The first table shown as Table 1 was obtained from analysis of the relationship between aqueous solution concentration and inflow outflow temperature difference indicated by the alternate long and short dash lines in FIG. 9, based on a premise that an output from the aqueous solution pump 132 not higher than about 70% of the maximum output indicates an abnormality.

Returning to FIG. 6, after Step S15, the inflow temperature sensor 146 detects an inflow temperature, and the outflow temperature sensor 152 detects an outflow temperature (Step S17). After Step S17, the CPU 162 obtains an inflow outflow temperature difference using the detected inflow temperature and the outflow temperature (Step S19). After Step S19 the process goes to Step S21.

In Step S21, the CPU 162 compares the predetermined value which was set in Step S15 to the inflow outflow temperature difference which was obtained in Step S19. As described above, since an abnormality causes a decrease in the output of the aqueous solution pump 132 which will result in an increase in the inflow outflow temperature difference (see FIG. 10), it is possible to determine whether or not there is an abnormality in the aqueous solution pump 132 by making comparison, as described, between the predetermined value and the inflow outflow temperature difference. Specifically, it is possible to determine whether or not the output of the aqueous solution pump 132 is not higher than about 70%, for example, of its maximum output by comparing the predetermined value and the inflow outflow temperature difference.

If Step S21 determines that the inflow outflow temperature difference is smaller than the predetermined value, the process goes to Step S23 and waits until the system is given a generation stop command. In other words, if the aqueous solution pump 132 is normal, the process goes to Step S23 and waits until the system is given a generation stop command. The CPU 162 determines that the system has been given the generation stop command if the charge rate of the secondary battery 128 has reached its upper limit value (preferably about 98%, for example), or if the main switch 140 has been turned OFF. Until Step S23 sees the generation stop command, the process keeps returning to Step S11 and repeats the process described above.

On the other hand, if Step S21 determines that the inflow outflow temperature difference is not smaller than the predetermined value, the process goes to Step S25. In other words, if the system determines that there is an abnormality in the aqueous solution pump 132, the process goes to Step S25. In Step S25, the buzzer 28c gives off alarm sounds following a command from the CPU 162, thereby notifying the driver that there is an abnormality in aqueous solution pump 132. After Step S25, the process goes to Step S27.

In Step S27, the CPU 162 determines whether or not the aqueous solution pump 132 is controlled so that it will operate at its maximum output (preferably about 2.5 L/min, for example, in the present preferred embodiment). In other words, the system determines whether or not the aqueous solution pump 132 is under a maximum output control. The state of output control on the aqueous solution pump 132 can be determined from, for example, supply power (supply voltage in the present preferred embodiment) to the aqueous solution pump 132. In Step S27, the system determines whether or not the aqueous solution pump 132 is under the maximum output control by determining whether or not the supply voltage is a predetermined voltage (preferably about 20 V, for example).

If Step S27 determines that the maximum output control is not underway, the CPU 162 sets the supply voltage for the aqueous solution pump 132 to the predetermined voltage, thereby bringing the aqueous solution pump 132 into the maximum output control (Step S29). After Step S29 the process goes to Step S23.

On the other hand, if Step S27 determines that the maximum output control is already underway, the CPU 162 turns ON the generation prohibition flag which is stored in the memory 166 in advance (Step S31), and brings the process to Step S33. The process also goes to Step S33 if Step S23 determines that a generation stop command is given.

In Step S33, the CPU 162 stops the operation of the air pump 134. After Step S33, the CPU 162 stops the operation of the aqueous solution pump 132 (Step S35). By stopping the air pump 134 and the aqueous solution pump 132 sequentially as described, the power generating procedure is brought to an end. Also, if Step S1 determines that the generation prohibition flag is in ON state as shown in FIG. 5, the procedure is brought to an end without entering the sequence of causing the cell stack 102 to generate power.

According to the fuel cell system 100 as described, it is possible to appropriately determine whether or not there is an abnormality in the aqueous solution pump 132, by obtaining the inflow outflow temperature difference and by comparing the inflow outflow temperature difference to a predetermined value. As described, by utilizing the inflow outflow temperature difference which is a difference between a detection result (inflow temperature) supplied from the inflow temperature sensor 146 and a detection result (outflow temperature) supplied from the outflow temperature sensor 152, it is possible to determine whether or not there is an abnormality in the aqueous solution pump 132, without the need to add or use additional detectors for abnormality determination.

As the power generation information of the fuel cell 104, a predetermined value is set based on aqueous methanol solution concentration. This makes it possible to obtain an appropriate predetermined value in accordance with the state of power generation in the fuel cell 104. Such a predetermined value ensures appropriate abnormality determination in the aqueous solution pump 132 at a high level of accuracy.

Detection of aqueous methanol solution concentration is performed while the fuel pump 130 is not in operation. This makes it possible to avoid concentration detection during the time of unstable changes in the aqueous solution concentration, ensuring that an appropriate predetermined value is obtained for setting.

After the fuel pump 130 is stopped, the process waits for a predetermined period so as to make sure that the change in the aqueous solution concentration has become more stabilized, which ensures with increased reliability that an appropriate predetermined value is obtained for setting.

Detection of aqueous methanol solution concentration is performed after a lapse of a predetermined period which is a time necessary for the inflow outflow temperature difference to attain its maximum value from the time of stoppage of the fuel pump 130. This makes it possible to obtain a concentration which has a one-to-one relationship with the inflow outflow temperature difference, ensuring with increased reliability that an appropriate predetermined value is obtained for setting.

Detection of inflow temperature and outflow temperature is performed after the system has shifted to normal operation since the temperature of the fuel cell 104 is stable in normal operation. This makes it possible to obtain an appropriate inflow outflow temperature difference, and to determine presence/absence of an abnormality in the aqueous solution pump 132 appropriately.

Using an aqueous methanol solution concentration which is detected by an ultrasonic sensor 142 makes it simple to determine whether or not the system is in normal operation.

If the aqueous solution pump 132 has a low output due to deterioration, a determination indicating presence of an abnormality is made, which is then followed by a maximum output control of the aqueous solution pump 132. This increases the amount of aqueous methanol solution supply to each fuel cell 104. By increasing the amount of supply as described, it becomes possible to reduce deterioration of individual fuel cells 104 which could be caused by non-uniform distribution of methanol. This also makes it possible to reduce decrease in the output of the cell stack 102.

If the system determines that an abnormality is present even if the maximum output control is underway, generation by the cell stack 102 is stopped because it is likely that the aqueous solution pump 132 is not in operation or deterioration of the aqueous solution pump 132 has reached a substantially advanced state. This arrangement makes it possible to reduce deterioration of individual fuel cells 104 which could be caused by non-uniform distribution of methanol.

Once power generation by the cell stack 102 has been stopped following a determination that indicates presence of an abnormality, power generation thereafter is prohibited. This makes possible to reduce deterioration of individual fuel cells 104 caused by non-uniform distribution of methanol, more reliably.

Notifying an abnormality of the aqueous solution pump 132 using the buzzer 28c increases the convenience of the fuel cell system 100.

According to a preferred embodiment of the present invention, it is possible to determine an abnormality in the aqueous solution pump 132 without the need to add or use additional detectors for the abnormality determination purpose. Since it is not necessary to increase the number of components and therefore it is possible to make the fuel cell system 100 compactly, the present preferred embodiment of the present invention is suitably applicable to a motorbike 10.

Next, reference will be made to FIG. 8B, to describe another example of the predetermined-value setting process which is performed in Step S15 in FIG. 6.

Figure 8B:
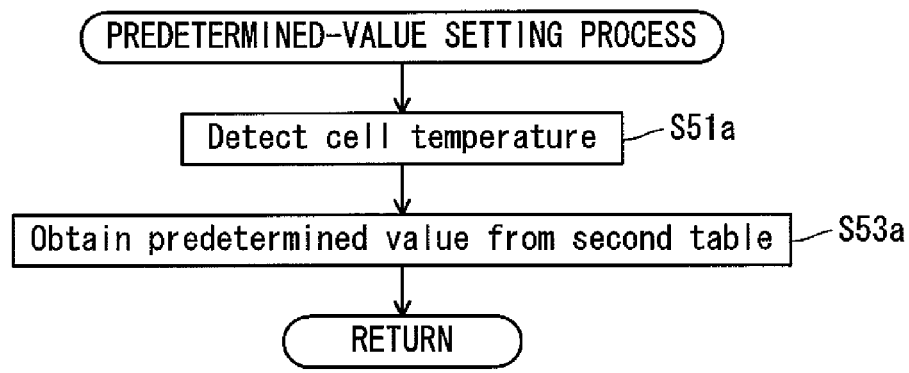

In the predetermined-value setting process shown in FIG. 8B, first, the cell temperature sensor 156 detects a temperature of the fuel cell 104 (Step S51*a*). Then, the CPU 162 obtains a temperature value which corresponds to the detected temperature of the fuel cell 104, as the predetermined value (Step S53*a*) from a second table.

The second table used in Step S53*a* is stored in the memory 166 in advance. An example of the second table is shown in Table 2 below. Also, a graph which shows a relationship between the cell temperature and the inflow outflow temperature difference is given in FIG. 11.

TABLE 2

| Fuel Cell Temperature [° C.] | Temperature [° C.] |
| --- | --- |
| 60 | 5.2 |
| 61 | 5.4 |
| 62 | 5.5 |
| 63 | 5.7 |
| 64 | 6.0 |
| 65 | 6.2 |
| 66 | 6.5 |
| 67 | 6.8 |
| 68 | 7.2 |
| 69 | 7.5 |
| 70 | 7.9 |

If the temperature of the fuel cells 104, i.e., the temperature of the cell stack 102, increases, then the outflow temperature also increases, and so does the inflow outflow temperature difference. Therefore, as shown in FIG. 11, the inflow outflow temperature difference increases with the temperature increase in the fuel cell 104.

In FIG. 11, solid lines show a relationship between the cell temperature and the inflow outflow temperature difference when the aqueous solution pump 132 is operating at its normal output (preferably about 80%, for example, of its maximum output in the present preferred embodiment). Also, in FIG. 11, alternate long and short dash lines show a relationship between the cell temperature and the inflow outflow temperature difference when the aqueous solution pump 132 is operating at, for example, about 70% output of its maximum output. As described earlier, the inflow outflow temperature difference also increases when there is an abnormality such as malfunction and deterioration which causes a decrease in the output of the aqueous solution pump 132 (see FIG. 10). For this reason, the inflow outflow temperature difference is greater in the case indicated by the alternate long and short dash lines in FIG. 11 than in the case indicated by the solid lines in FIG. 11.

The second table shown as Table 2 was obtained from analysis of the relationship between cell temperature and inflow outflow temperature difference indicated by the alternate long and short dash lines in FIG. 11, based on a premise that an output from the aqueous solution pump 132 not higher than, for example, about 70% of the maximum output indicates an abnormality.

Use of the second table as described in setting a predetermined value in accordance with the temperature of the fuel cell 104 also makes it possible to set an appropriate predetermined value which reflects the state of power generation of the fuel cell 104, and to improve abnormality detection accuracy of the aqueous solution pump 132.

It should be noted here that in FIG. 11, the inflow outflow temperature difference starts to show a greater increase when the fuel cell 104 attains a temperature of approximately 65° C., for example. This is due to an arrangement that as the fuel cell 104 attains the temperature of about 65° C., for example, a fan for the radiator 114*a* starts its operation to cool aqueous methanol solution on the return route to the aqueous solution tank 118 thereby decreasing the inflow temperature.

Next, reference will be made to FIG. 8C, to describe still another example of the predetermined-value setting process which is performed in Step S15 in FIG. 6.

Figure 8C:
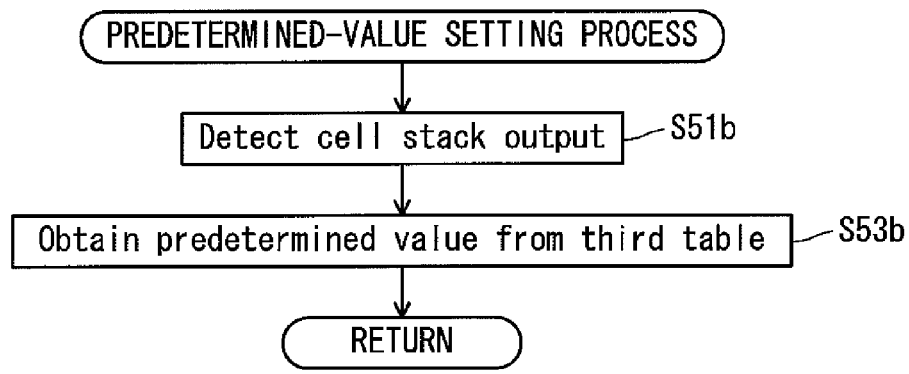

In the predetermined-value setting process shown in FIG. 8C, first, the CPU 162 detects an output of the cell stack 102 using a voltage detection value from the voltage detection circuit 168 and a electric current detection value from the electric current detection circuit 170 (Step S51*b*). Then, the CPU 162 obtains a temperature value which corresponds to the detected output of the cell stack 102, as the predetermined value from a third table (Step S53*b*).

The third table used in Step S53*b* is stored in the memory 166 in advance. An example of the third table is shown below as Table 3. Also, a graph which shows a relationship between the output of the cell stack 102 and inflow outflow temperature differences is given in FIG. 12.

TABLE 3

| Cell Stack Output [W] | Temperature [° C.] |
| --- | --- |
| 600 | 13.1 |
| 610 | 13.2 |
| 620 | 13.3 |
| 630 | 13.5 |
| 640 | 13.6 |
| 650 | 13.7 |
| 660 | 13.9 |
| 670 | 14.0 |
| 680 | 14.1 |
| 690 | 14.2 |
| 700 | 14.3 |

Increase in the output from the cell stack 102 increases Joule heat, and therefore increases the temperature of the cell stack 102 and the outflow temperature. Thus, as shown in FIG. 12, the inflow outflow temperature difference increases with increasing output of the cell stack 102 (substantially in proportion thereto).

Figure 12:
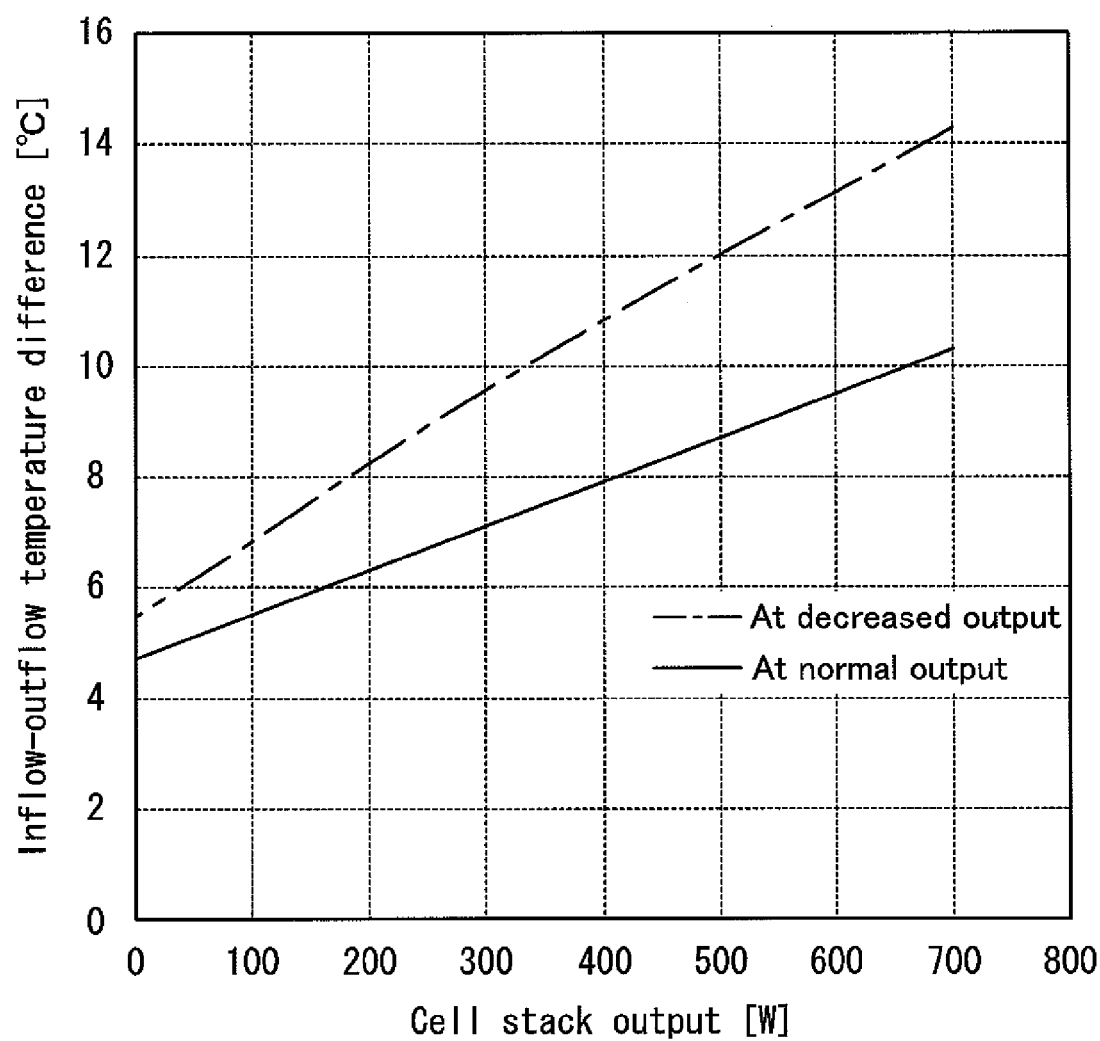
FIG. 12 is a graph for describing a relationship between cell stack output and inflow outflow temperature difference.

In FIG. 12, solid lines show a relationship between the cell stack output and the inflow outflow temperature difference when the aqueous solution pump 132 is operating at its normal output (preferably about 80%, for example, of its maximum output in the present preferred embodiment). Also, in FIG. 12, alternate long and short dash lines show a relationship between the cell stack output and the inflow outflow temperature difference when the aqueous solution pump 132 is operating at, for example, about 70% output of its maximum output. As described earlier, the inflow outflow temperature difference also decreases when there is an abnormality such as malfunction and deterioration which causes a decrease in the output of the aqueous solution pump 132 (see FIG. 10). For this reason, the inflow outflow temperature difference is greater in the case indicated by the alternate long and short dash lines in FIG. 12 than in the case indicated by the solid lines in FIG. 12.

The third table shown as Table 3 was obtained from analysis of the relationship between cell stack output and inflow outflow temperature difference indicated by the alternate long and short dash lines in FIG. 12, based on a premise that an output from the aqueous solution pump 132 not higher than, for example, about 70% of the maximum output indicates an abnormality.

Use of the third table as described in setting a predetermined value in accordance with the output of the cell stack 102 also makes it possible to set an appropriate predetermined value which reflects the state of power generation of the fuel cell 104, and to improve abnormality detection accuracy of the aqueous solution pump 132.

It should be noted here that in the power generating procedure shown in FIG. 5 and FIG. 6, aqueous methanol solution concentration preferably provides the basis for determining whether or not the system is in normal operation. However, the present invention is not limited to this.

Figure 13:
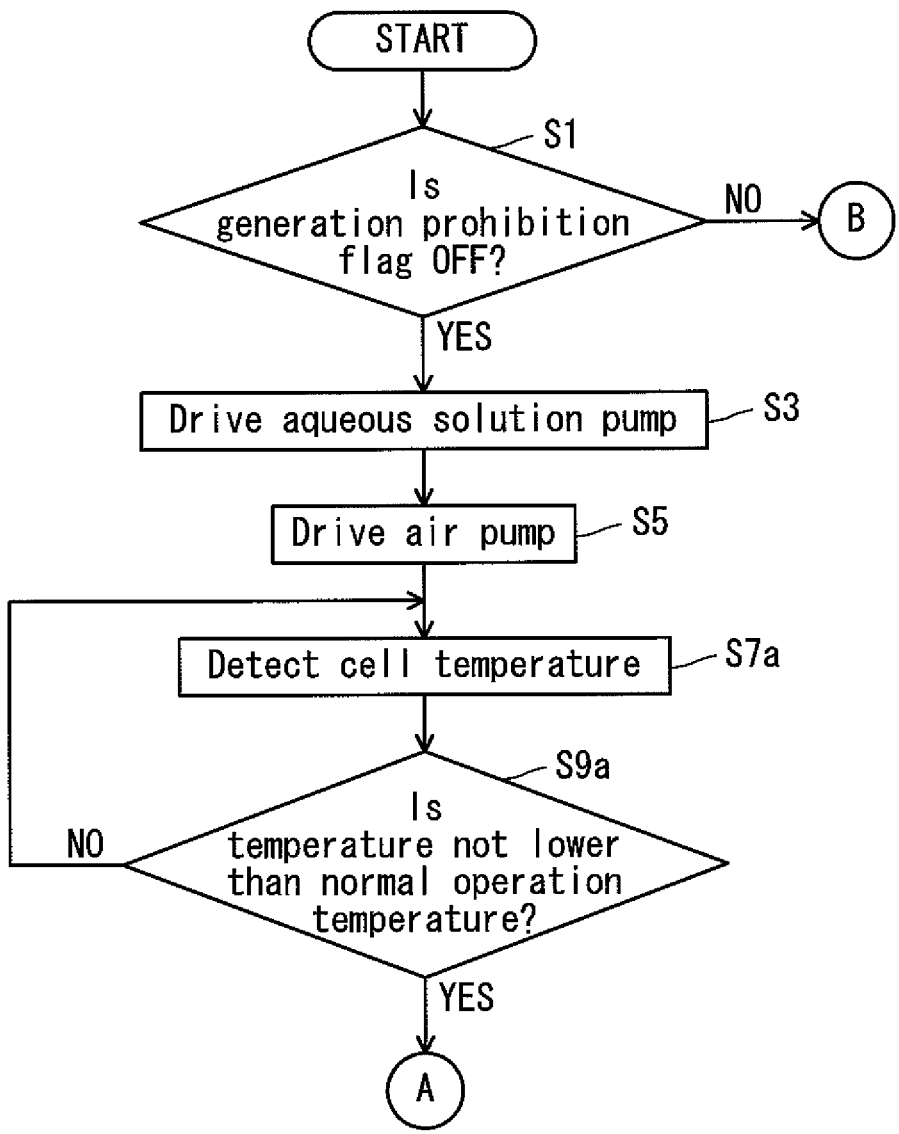
FIG. 13 is a flowchart showing another example of power generating procedure in a fuel cell system according to a preferred embodiment of the present invention.

For example, as shown in FIG. 13, the process may include Step S7a, where the cell temperature sensor 156 detects a temperature of the fuel cell 104. This step is followed by Step S9a to determine whether or not the temperature of the fuel cell 104 is not lower than the normal operation temperature (preferably about 60° C., for example, in the present preferred embodiment).

As described earlier, the fuel cell system 100 shifts to normal operation if the fuel cell 104 attains the normal operation temperature. Therefore, comparing the temperature of the fuel cell 104 to the normal operation temperature as described above provides another simple way to determine whether or not the system is in normal operation.

Figure 14:
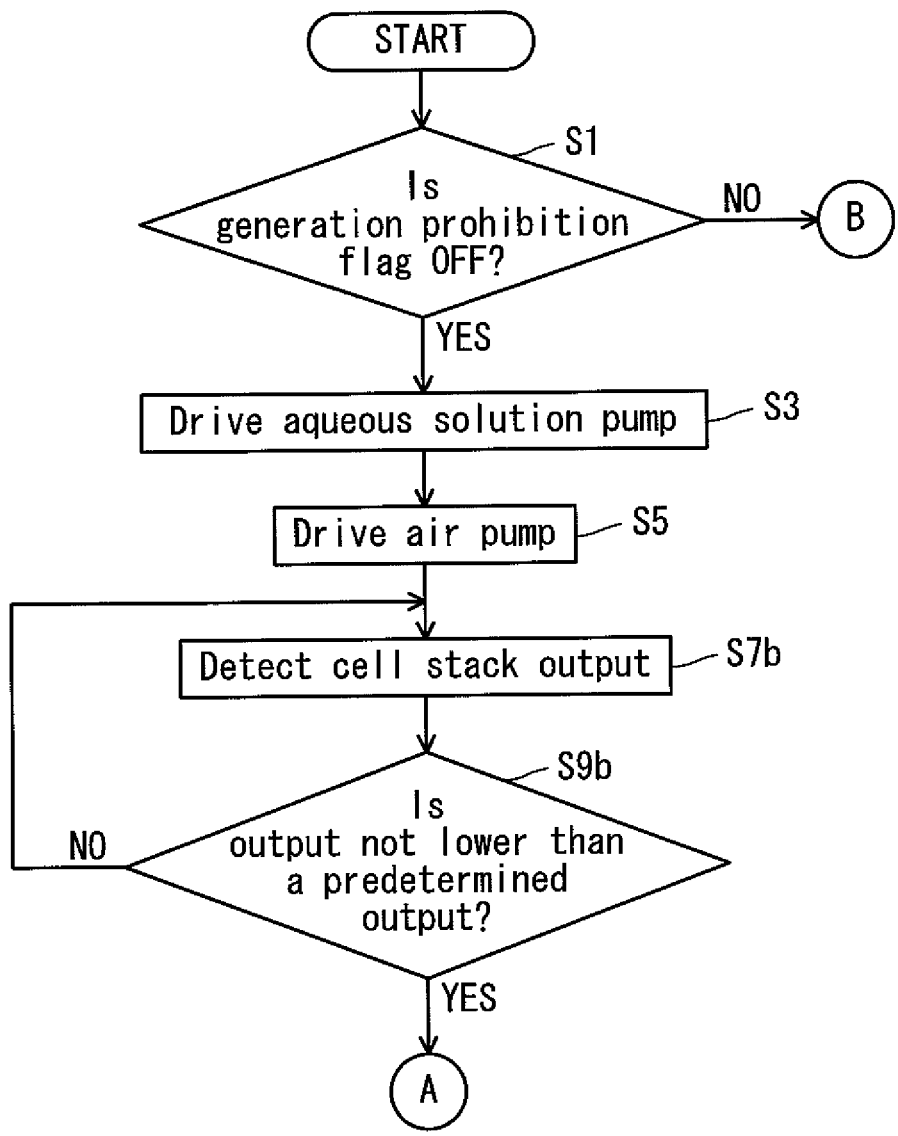
FIG. 14 is a flowchart showing still another example of power generating procedure in a fuel cell system according to a preferred embodiment of the present invention.

As another example, as shown in FIG. 14, the process may include Step S7b, where a detection result from the voltage detection circuit 168 and a detection result from the electric current detection circuit 170 are used to detect an output of the cell stack 102. This step is followed by Step S9b to determine whether or not the output of the cell stack 102 is not lower than a predetermined output (preferably about 600 W, for example, in the present preferred embodiment).

As described earlier, the output of the cell stack 102 in normal operation is not lower than a predetermined output. Therefore, comparing the output of the cell stack 102 to the predetermined output as described above provides another simple way to determine whether or not the system is in normal operation.

It should be noted here that in the power generating procedure shown in FIG. 5 and FIG. 6, description was made for a case where setting of the predetermined value is carried out preferably after Step S11 and S13. However, the present invention is not limited to this. Steps S11 and S13 in FIG. 6 may be omitted.

In the preferred embodiment described above, a maximum output control is preferably performed if the maximum output control is not in operation when the system has determined that there is an abnormality (see Steps S27 and S29 in FIG. 6). However, the present invention is not limited to this. The output of the aqueous solution pump 132 may be increased in a stepwise manner if the maximum output control is not in operation when the system has determined that there is an abnormality.

In the preferred embodiment described above, when the system has determined that there is an abnormality, the system preferably determines if the maximum output control is in operation, and then, takes actions such as starting the maximum output control and turning ON the generation prohibition flag based on a result of the determination (see Steps S27 through S31 in FIG. 6). However, these processes may be omitted.

In the preferred embodiment described above, description was made for a case where a predetermined value is preferably set based on the power generation information (aqueous solution concentration, cell temperature or cell stack output), and thereafter detection is made for the inflow temperature and outflow temperature (see FIG. 6 and FIG. 8). However, the present invention is not limited to this. Detection of the inflow temperature and outflow temperature may be made before setting the predetermined value. Also, detection of the inflow temperature and outflow temperature may be made simultaneously with the detection of the aqueous solution concentration, the cell temperature or the cell stack output (setting of the predetermined value).

In the preferred embodiment described above, description was made for cases where the setting of the predetermined value is preferably based on the aqueous solution concentration, cell temperature or cell stack output. However, the predetermined value is not limited to this. A discretionary value may be set as the predetermined value in advance for the purpose of comparison with the inflow outflow temperature difference.

In the preferred embodiment described above, description was made for a case where the predetermined period preferably is a period which is necessary for the inflow outflow temperature difference to attain a maximum value starting from stoppage of the fuel pump 130. However, the predetermined period is not limited to this. In setting the predetermined period, the end of the predetermined period may be set to any time point between the time when the inflow outflow temperature difference has attained its maximum value and the time when the fuel pump 130 is driven.

In the preferred embodiment described above, description was made for a case where the inflow temperature is detected as the first temperature information. However, the first temperature information is not limited to this. The first temperature information may be any information as far as it has a corresponding relationship with the inflow temperature. For example, the first temperature information may be a voltage value of a selected fuel cell 104 detected by a voltage sensor. In this case, a voltage sensor detects a voltage of another fuel cell 104 which is on the downstream side as viewed from the selected fuel cell 104, so that the detected voltage value is used as the second temperature information. Then, a difference between the voltage value of the selected fuel cell 104 and the voltage value of the downstream fuel cell 104 is used as the difference information. As another example, a voltage across the cell stack 102 may be used as the difference information.

Also, in the preferred embodiment described above, description was made for a case where the concentration information is preferably provided by a concentration of aqueous methanol solution. However, the concentration information is not limited to this. The concentration information may be any information as far as it has a corresponding relationship with aqueous methanol solution concentration.

An example is a voltage value obtained from the ultrasonic sensor 142. Another example may be that a voltage sensor detects an open circuit voltage of a fuel cell 104, so that the detected voltage value is used as electrochemical concentration information. Further, an output of the cell stack 102 may be used as the concentration information.

In the preferred embodiment described above, description was made for a case where a temperature of a fuel cell 104 is preferably detected as the third temperature information. However, the third temperature information is not limited to this. The third temperature information may be any information as far as it has a corresponding relationship with the temperature of the fuel cell 104. An example may be a voltage value of a discretionary fuel cell 104 detected by a voltage sensor.

In the preferred embodiment described above, description was made for a case where an output of the cell stack 102 is preferably detected as the output information. However, the output information is not limited to this. The output information may be any information as far as it has a corresponding relationship with the output of the fuel cell 104. For example, the output information may be provided by an output of one fuel cell 104 obtained from an output of the cell stack 102.

Positions where the inflow temperature sensor 146 and the outflow temperature sensor 152 are placed are not limited to those in the preferred embodiments described above. The inflow temperature sensor 146 may be provided at a discretionary position between the aqueous solution tank 118 and the most upstream fuel cell 104 in the cell stack 102. Also, the outflow temperature sensor 152 may be provided at a discretionary position between the most downstream fuel cell 104 in the cell stack 102 and the radiator 114a.

In the preferred embodiments described above, methanol is preferably used as high concentration fuel, and aqueous methanol solution is preferably used as aqueous fuel solution. However, the present invention is not limited to this, and the high concentration fuel may be provided by other alcoholic fuel such as ethanol, and the aqueous fuel solution may be provided by aqueous solution of the alcohol, such as aqueous ethanol solution.

The fuel cell system according to various preferred embodiments of the present invention is suitable not only for motorbikes but also for any other transportation equipment, including automobiles and marine vessels.

In the preferred embodiments described above, description was made for a direct methanol fuel cell system. However, the present invention is not limited to this. The present invention is also applicable to fuel cell systems equipped with a reformer, and to hydrogen fuel cell systems which use hydrogen as the fuel to be supplied to the fuel cells.

Also, the present invention is applicable not only to transportation equipment but also to stationary type fuel cell systems, and further, to portable type fuel cell systems for use in electronic equipment such as personal computers and other mobile devices.

The present invention being thus far described in terms of preferred embodiments, which may be varied in many ways within the scope and the spirit of the present invention. The scope of the present invention is only limited by the accompanied claims.

What is claimed is:

1. A direct methanol fuel cell system comprising:
    a fuel cell;
    a fuel supply device arranged to supply the fuel cell with an aqueous fuel solution;
    a first temperature detector arranged to detect first temperature information regarding a temperature of the fuel supplied to the fuel cell;
    a second temperature detector arranged to detect second temperature information regarding a temperature of the aqueous fuel solution discharged from the fuel cell;
    an abnormality determination section arranged and programmed to determine an abnormality in the fuel supply device based on a result of comparison between a predetermined value and difference information regarding a difference between the first temperature information and the second temperature information;
    a concentration detector arranged to detect concentration information regarding a concentration of the aqueous fuel solution; and
    a concentration adjuster arranged to adjust the concentration of the aqueous fuel solution; wherein
    the concentration detector performs detection while the concentration adjuster is not in operation.

2. The direct methanol fuel cell system according to claim 1, further comprising a setting section arranged and programmed to set the predetermined value based on power generation information regarding a state of power generation in the fuel cell.

3. The direct methanol fuel cell system according to claim 2, wherein the power generation information is defined by the concentration information.

4. The direct methanol fuel cell system according to claim 2, further comprising at least one of a third temperature detector arranged to detect third temperature information regarding a temperature of the fuel cell and an output detector arranged to detect output information regarding an output of the fuel cell, wherein the power generation information is defined by one of the third temperature information and the output information.

5. The direct methanol fuel cell system according to claim 1, wherein the concentration detector is programmed to perform the detection after a lapse of a predetermined period from a stoppage of the concentration adjuster.

6. The direct methanol fuel cell system according to claim 5, wherein the predetermined period is defined by a period necessary at least for the difference information to attain its maximum value after the stoppage of the concentration adjuster.

7. The direct methanol fuel cell system according to claim 1, further comprising an operation state determination section arranged and programmed to determine whether or not the fuel cell is in normal operation where constant power generation is possible, based on power generation information regarding a state of power generation in the fuel cell, wherein the first temperature detector and the second temperature detector perform respective detections in accordance with a result of determination by the operation state determination section.

8. The direct methanol fuel cell system according to claim 7, wherein the fuel is an aqueous fuel solution, the fuel cell system further comprising a concentration detector arranged to detect concentration information regarding a concentration of the aqueous fuel solution, and the power generation information is defined by the concentration information.

9. The direct methanol fuel cell system according to claim 7, further comprising at least one of a third temperature detector arranged to detect third temperature information regarding a temperature of the fuel cell and an output detector arranged to detect output information regarding an output of the fuel cell, wherein the power generation information is provided by one of the third temperature information and the output information.

10. The direct methanol fuel cell system according to claim 1, further comprising an output control section arranged and programmed to increase an output of the fuel supply device based on a result of determination by the abnormality determination section.

11. The direct methanol fuel cell system according to claim 10, further comprising a stoppage control section arranged and programmed to stop power generation in the fuel cell based on a result of determination by the abnormality determination section and a state of the output control of the fuel supply device by the output control section.

12. The direct methanol fuel cell system according to claim 11, further comprising a prohibition control section arranged and programmed to prohibit power generation in the fuel cell after a stoppage of power generation in the fuel cell by the stoppage control section.

13. The direct methanol fuel cell system according to claim 1, further comprising a notifier arranged to provide notification of a result of determination by the abnormality determination section.

14. Transportation equipment comprising the direct methanol fuel cell system according to claim 1.

15. The direct methanol fuel cell system according to claim 1, wherein the fuel supply device includes an aqueous solution pump.

* * * * *